United States Patent
Maruta et al.

(10) Patent No.: US 6,299,364 B1
(45) Date of Patent: Oct. 9, 2001

(54) METHOD OF PRINTING AND PRINTING SYSTEM

(75) Inventors: Syuji Maruta; Yoshikazu Ikenoue, both of Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/154,023

(22) Filed: Sep. 16, 1998

(30) Foreign Application Priority Data

| Sep. 17, 1997 | (JP) | 9-251632 |
| Sep. 17, 1997 | (JP) | 9-251633 |
| Sep. 17, 1997 | (JP) | 9-251634 |

(51) Int. Cl.$^7$ .................... B41J 11/44; B41J 3/42
(52) U.S. Cl. .................. 400/76; 400/70; 400/61
(58) Field of Search ............... 400/76, 70, 61; 399/79, 8; 395/100–120; 358/1.1–1.18

(56) References Cited

U.S. PATENT DOCUMENTS

| 4,653,899 | * | 3/1987 | Watanabe | 355/14 |
| 5,383,129 | * | 1/1995 | Farrell | 364/464.01 |
| 5,426,594 | * | 6/1995 | Wright et al. | 364/514 |
| 5,638,497 | * | 6/1997 | Kimber et al. | 395/114 |
| 5,850,584 | * | 12/1998 | Robinson et al. | 399/79 |
| 6,064,838 | * | 5/2000 | Maruta et al. | 399/79 |

* cited by examiner

*Primary Examiner*—John S. Hilten
*Assistant Examiner*—Charles H. Nolan, Jr.
(74) *Attorney, Agent, or Firm*—McDermott, Will & Emery

(57) ABSTRACT

A printing system comprising a data processor, a printer, and an ID code transmitter for allotting an ID code to a data file for distinguishing the data file from others. An input device is mounted on the printer for providing the ID code to the printer before a printing process is executed. The printer executes the printing process in response to the ID code provided thereto and on the basis of the data file to which the ID code has been allotted. The invention is particularly adapted for preventing the user of the data processor from obtaining a printout on the basis of another user's data file by mistake.

27 Claims, 20 Drawing Sheets

METHOD OF PRINTING AND PRINTING SYSTEM

BACKGROUND OF THE INVENTION

This application is based on Japanese Patent Application No. 251632/1997 filed on Sep. 17, 1997, No. 251633/1997 filed on Sep. 17, 1997, and No. 251634/1997 filed on Sep. 17, 1997, the contents of which are incorporated herein by reference.

1. Field of the Invention

This invention relates to a method of printing and a printing system for printing an image on the basis of an image data contained in an image file. The image file is specified by a user and transmitted from his or her data processor to a printer through a telecommunication line.

2. Description of the Prior Art

With an increase in image software and with the spread of communication between personal computers, it is becoming possible for the user of a personal computer to allow any kind of images to be displayed on the screen of his or her personal computer. The availability of high-performance printers which are relatively inexpensive in cost makes it easy to print the images.

Some of the high-performance printers are capable of printing out color images in large-sized copy with picture quality approximating to that of silver photography. However, it should be realized that it would be expensive for a common user to personally possess such an extra-high-performance printer.

A printing system for solving the aforesaid problem has heretofore been proposed (as disclosed in Japanese Laid Open Patent Application No. 9-39311), where a plurality of personal computers are connected to an extra-high-performance color printer by means of a telecommunication line so that the color printer may be put to common use by the users of the personal computers.

FIG. 20 depicts a conventional printing system 800 comprising personal computers 802a to 802c, high-performance color printer 804, printer controller 805 for controlling the color printer 804, display 803 attached to the printer controller 805, and telecommunication line 806. The personal computers 802a to 802c are provided at the residences of users, while the color printer 804 and the printer controller 805 are installed, e.g., in a convenience store.

Let it be assumed that the user of the personal computer 802a wishes to print out an image. He or she inputs an image file DFa, an instruction for giving advance notice of printing, and his or her name.

The personal computer 802a gives an image file number 903a to the image file DFa and transmits a headder file 902a, which consists of the user's name and the image file number 903a, to the printer controller 805 and the color printer 804, in both of which headder files 902a to 902c transmitted from the personal computers 802a to 802c are stored. At this point of time, the image file DFa per se has not been transmitted to the printer controller 805 and the color printer 804 as yet.

The user of the personal computer 802a goes to the convenience store in which the printer controller 805 and the color printer 804 are installed, because he or she has to give to them a command to execute a printing process. He or she finds out his or her name and image file number 903a from among a plurality of users' names and image file numbers 903a to 903c displayed on the screen of the display 803 attached to the printer controller 805, and inputs an instruction for causing the color printer 804 to execute the printing process for the image file number 903a. Then the image file DFa is transmitted from the personal computer 802a to the color printer 804 and stored in a memory 807 incorporated therein. Thereafter, the printing process is executed.

Because of a plurality of users' names and image file numbers 903a to 903c displayed on the screen of the display 803, it is difficult to preclude the possibility of a wrong image file number being chosen by mistake.

A further previously proposed printing system (see Japanese Laid Open Patent Application No. 7-14326) has been designed such that an image file transmitted from a client to a server is erased when a request for the image file is not made from a printer within a prescribed length of time.

A particular advantage obtained from this printing system resides in the fact that the necessity of storing a large number of image files, for which printing processes are not executed, is avoided.

On the other hand, one of the problems encountered with this printing system is that an image file, for which the execution of a printing process is necessary but has been delayed for some reason or other, is also erased.

In order to cope with the aforesaid problem, information on whether consent to the erasion is given or withheld may be regarded as suitable for being added to an image file when it is transmitted from a client to a server. The use of such information is, however, undesirable because many users will aimlessly withhold their consent to the erasion. The result is that a large number of image files will have to be stored in a memory.

The conventional printing system 800 shown in FIG. 20 has another disadvantage which is derived from the fact that the image file DFa is not transmitted from a personal computer to the color printer 804 until the user of the personal computer inputs an instruction for causing the color printer 804 to execute the printing process. This means that execution has to be suspended while waiting for the image file DFa from the personal computer.

As is known, the capacity of an image file and the time required for transmitting it from a personal computer to the color printer 804 are proportional to the size and the desired picture quality of an image. Long waiting time comes to nothing and adversely affects the productive capacity of the color printer 804.

As an alternative to the foregoing, all the image files DFa for which it may possibly be found desirable to execute printing processes in the future may be transmitted beforehand from the personal computer 802a to the color printer 804. This alternative is, however, undesirable because it requires a large-capacity memory to be incorporated in the color printer 804 for storing a large number of image files DFa and will thereby result in high costs.

SUMMARY OF THE INVENTION

The present invention is concerned with eliminating these difficulties. As such, the primary object of the invention is to provide a printing system of the character referred to in which the user of a personal computer is prevented from obtaining a printout on the basis of another user's image file by mistake.

Another object of the invention is to provide a printing system of the character referred to in which the necessity of storing a large number of image files, for which printing processes are not executed, is avoided.

Still another object of the invention is to provide a printing system of the character referred to in which the necessity of providing a large-capacity memory in a printer is obviated and a printing process can be executed in the printer without waiting for a data file from a personal computer.

The printing system in accordance with the invention comprises a first data processor for transmitting a data file on the basis of which a user wishes to print out an image in hard copy and for transmitting a data code for distinguishing the data file from others, a second data processor connected to the first data processor by means of a telecommunication line, and a printer connected to the second data processor and adapted to execute a printing process on the basis of the data file. The second data processor includes identification (ID) code transmitting means for allotting an ID code to a data file or files or a data code or codes received from the first data processor and transmitting the ID code to the first data processor. The printer includes input means for entering data codes and ID codes. A data file transmitted from the first data processor to the second data processor is not transmitted from the second data processor to the printer unless a data code and an ID code transmitted from the printer to the second data processor agree with those transmitted from the first data processor to the second data processor.

DESCRIPTION OF THE PREFERRED EMBODIMENTS

Figure 1:
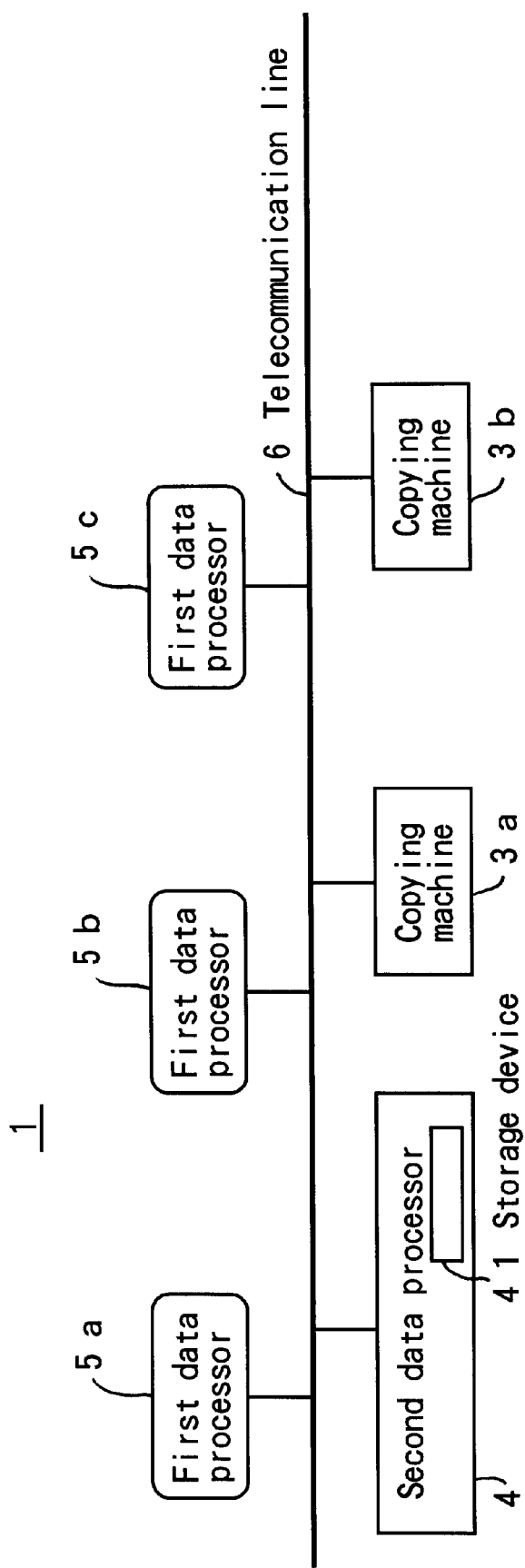
FIG. 1 is a schematic showing of a layout with several components combined into a printing system in accordance with the invention.

Referring now to FIG. 1, a printing system 1 in accordance with the invention comprises first data processors 5a to 5c, a second data processor 4, copying machines 3a and 3b, and a telecommunication line 6 connecting all of these components to each other. The printing system 1 as shown in the drawing has contemplated the use of three data processors 5a to 5c and two copying machines 3a and 3b, but it will of course be understood that the number of first data processors and/or the number of copying machines may be increased or decreased.

The first data processors 5a to 5c may be provided at the residences of users. The second data processor 4 may be installed in a data management center. The copying machines 3a and 3b may be installed in convenience stores. Alternatively, all of these components may be installed in a building and even in the same room. An analog or digital public line, leased line, local area network, wide area network or internet may be suitable for use as the telecommunication line 6.

An image file is set in one of the first data processors 5a to 5c by the user thereof who wishes to print an image on the basis of an image data contained in the image file. Other data needed for printing, if any, are also entered or set. This makes the contents of the image file ready for being printed by either of the copying machines 3a and 3b.

The expression "image file" as used herein is a general term for a file in which various image data including compressed ones are listed and a text file in which text data are listed. Each of the copying machines 3a and 3b is a digital color copying machine having an image reader and a printer. As will appear hereinafter, the printer is used for printing an image on the basis of the image file.

Only one of the first data processors 5a to 5c will be described hereinafter, because they have identical construction and function with each other. As this specification proceeds, there are some cases where they are referred to as the "first data processors 5" and one of them is referred to as the "first data processor 5".

What has been explained in the preceding paragraph applies mutatis mutandis to the copying machines 3a and 3b.

Figure 2:
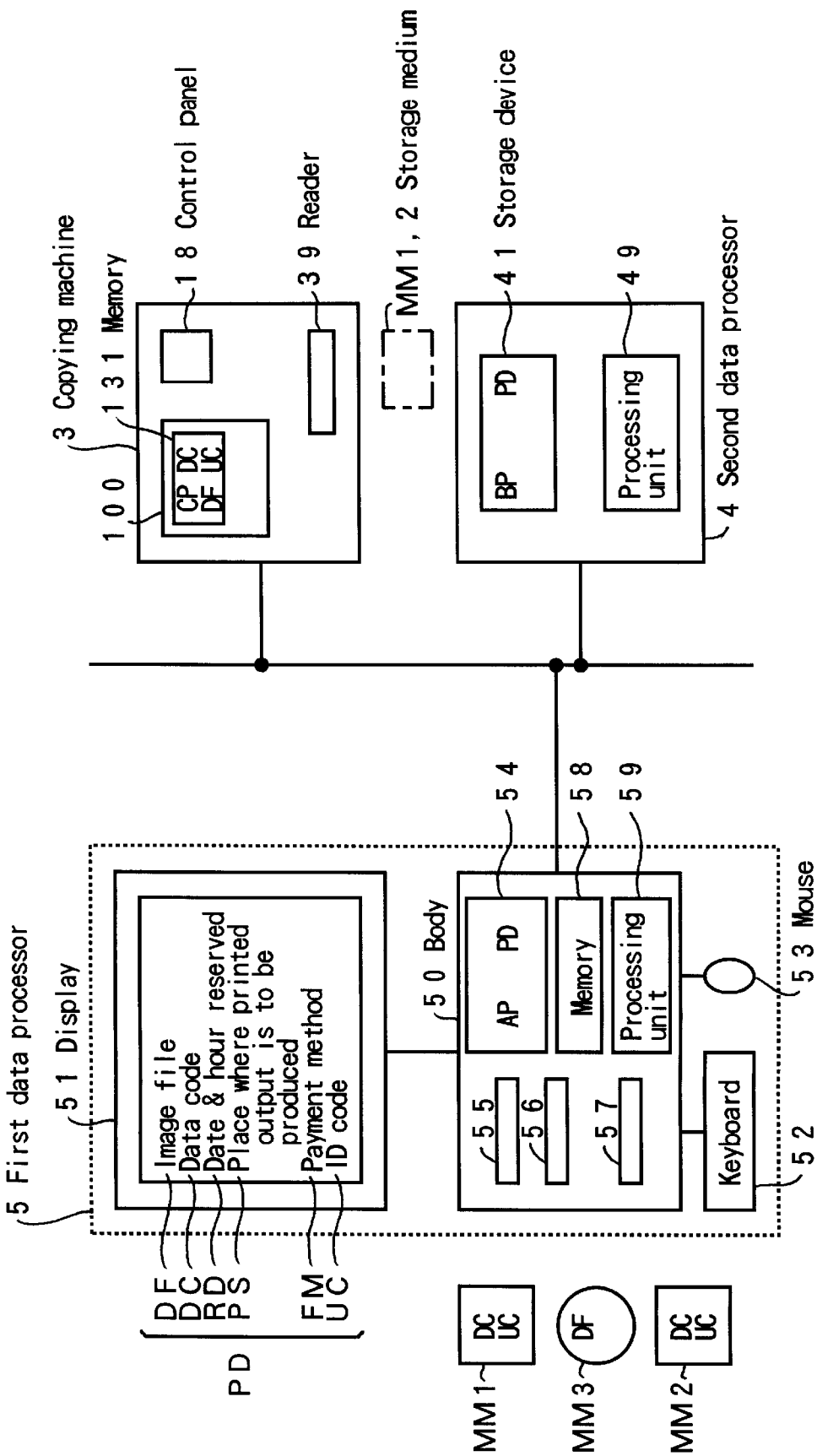
FIG. 2 is a block diagrammatic representation thereof.

FIG. 2 shows functional relationships among the first data processor 5, second data processor 4 and copying machine 3.

The first data processor 5 comprises a main body 50, display 51, keyboard 52 and mouse 53. A personal computer or a workstation, in which an appropriate program is installed, may be suitable for use as the first data processor 5.

The main body 50 has a hard disk 54, floppy disk drive 55, CD-ROM drive 56, IC card slot 57, memory 58 and processing unit 59.

The floppy disk drive 55 permits data to be written into and read out of a floppy disk MM1. The CD-ROM drive 56 reads data from a CD-ROM MM3. The IC card slot 57 permits data to be written into and read out of an IC card MM2.

The hard disk 54 holds a program AP for affording necessary capabilities to the first data processor 5, an image file DF on the basis of which a user wishes to print out an image in hard copy, and information PD needed for executing a printing process on the basis of the image file DF. There may be some cases where some of those to be held by the hard disk 54 are stored, instead, in the memory 58. As occasion demands, they are transferred to a main memory.

The information PD comprises the name of the image file DF, data code DC, date and hour RD reserved for printing, place PS where the printed output is to be produced, payment method FM and ID code UC. The information PD is displayed on the screen of the display 51.

The information PD is entered via the keyboard 52 or the mouse 53. A plurality of image files DF may be contained in a single piece of information PD. A data code DC is given to each image file DF by the user. The ID code UC is not entered by the user but automatically produced in the second data processor 4 and transmitted therefrom to the first data processor 5 in reply to the receipt of the information PD from the first data processor 5. The data code DC and the ID code UC will be hereinafter more fully described.

When the information PD other than the ID code UC has been entered in the first data processor 5, it is either held by the hard disk 54 or stored in the memory 58 and then transmitted to the second data processor 4 through the telecommunication line 6. Incidentally, either all or only some of those constituting the information PD will be hereinafter referred to as the "information PD".

Operations are performed as will appear hereinafter in the processing unit 59 on the basis of the program AP held by the hard disk 54.

The second data processor 4 is similar to the first data processor 5 described above in so far as the former also consists of a personal computer or a workstation. A storage device 41 incorporated therein in the form of a hard disk or a memory holds a program BP for affording necessary capabilities to the second data processor 4, information PD received from the first data processor 5, and ID code UC produced in the second data processor 4.

On the basis of the program BP, operations are performed in a processing unit 49 incorporated in the second data processor 4. For example, the information PD is transmitted to the copying machine 3. The data code DC and the ID code UC stored in the storage device 41 are compared with those transmitted from the copying machine 3. These operations will be hereinafter more fully described.

The copying machine 3 is a digital color copying machine which can operate in two modes, namely a copying mode wherein an image printed on a document is read and reproduced and a printing mode wherein the contents of an image file received from an external device such as the second data processor 4 are reproduced. The copying machine 3 is connected to the telecommunication line 6 through an interface and has a communication control unit.

The copying machine 3 is provided with a control panel 18, control unit 100, and reader 39 for reading data out of storage media. The control unit 100 includes a memory 131, which consists of a hard disk or a semiconductor memory and stores a program CP for controlling the printer, data code DC and ID code UC either entered via the control panel 18 or read by the reader 39 out of the storage medium MM1 or MM2, image file DF received from the second data processor 4, and a portion of the information PD.

The storage medium MM1 or MM2 is inserted into the reader 39 so that the data code DC and the ID code UC may be read therefrom. This will be hereinafter more fully described.

Figure 3:
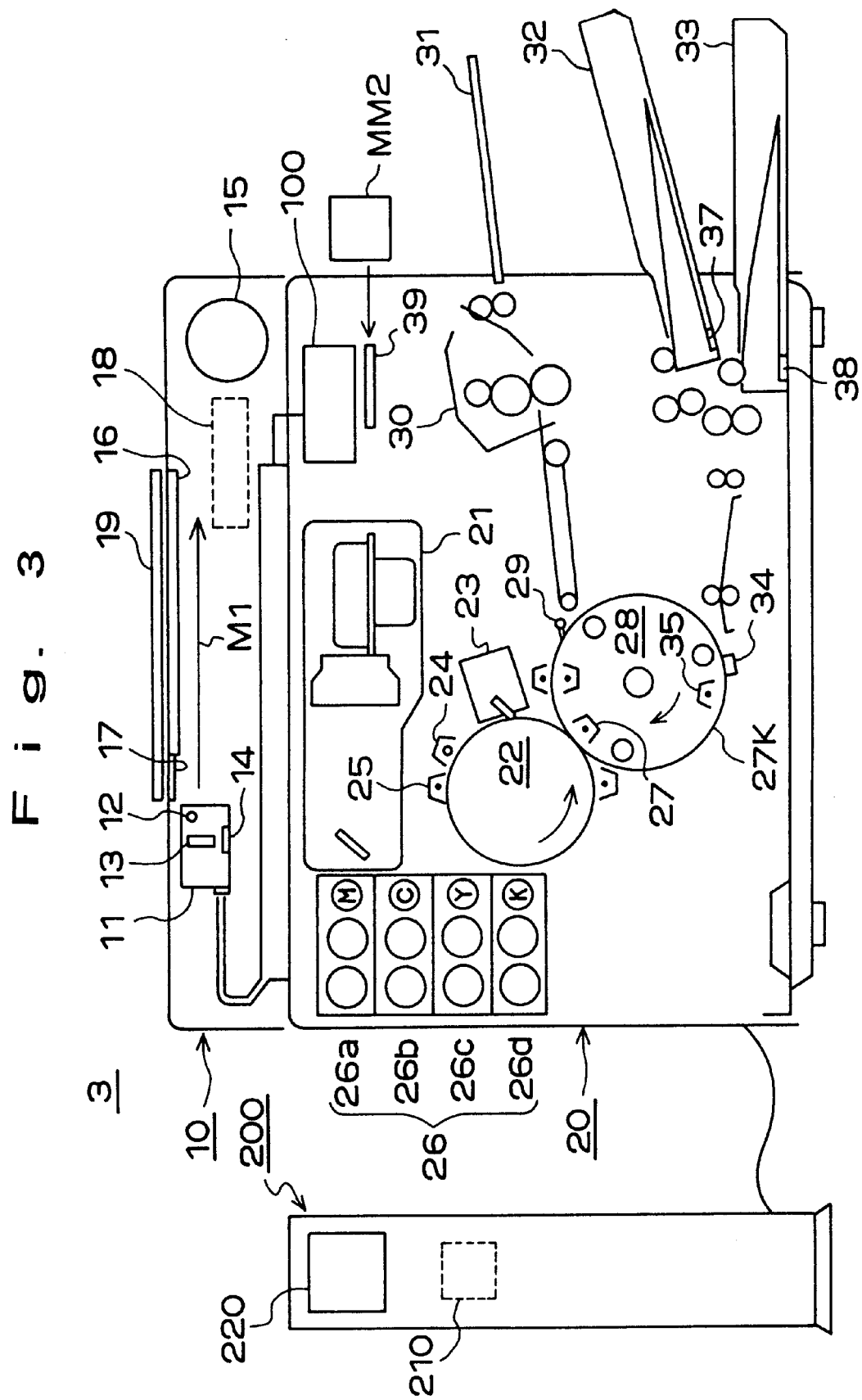
FIG. 3 is a view showing the component parts of a copying machine.

Referring now to FIG. 3, the copying machine 3 comprises an image reading station 10 for reading an image printed on a document, printing station 20 for reproducing an image read in the image reading station 10 or an image corresponding to an image file received from an external device, and vending station 200 for collecting charges.

The image reading station 10 comprises a scanner 11, platen 16, document cover 19, and control panel 18. The control panel 18 is provided on the front or upper wall of the image reading station 10.

The scanner 11 comprises a lamp 12 which illuminates a document on the platen 16, rod lens array 13 through which light rays reflected from the document are transmitted, and contact CCD color image sensor (hereinafter referred to as the "CCD sensor") 14 for converting the light rays into an electric signal.

Figure 4:
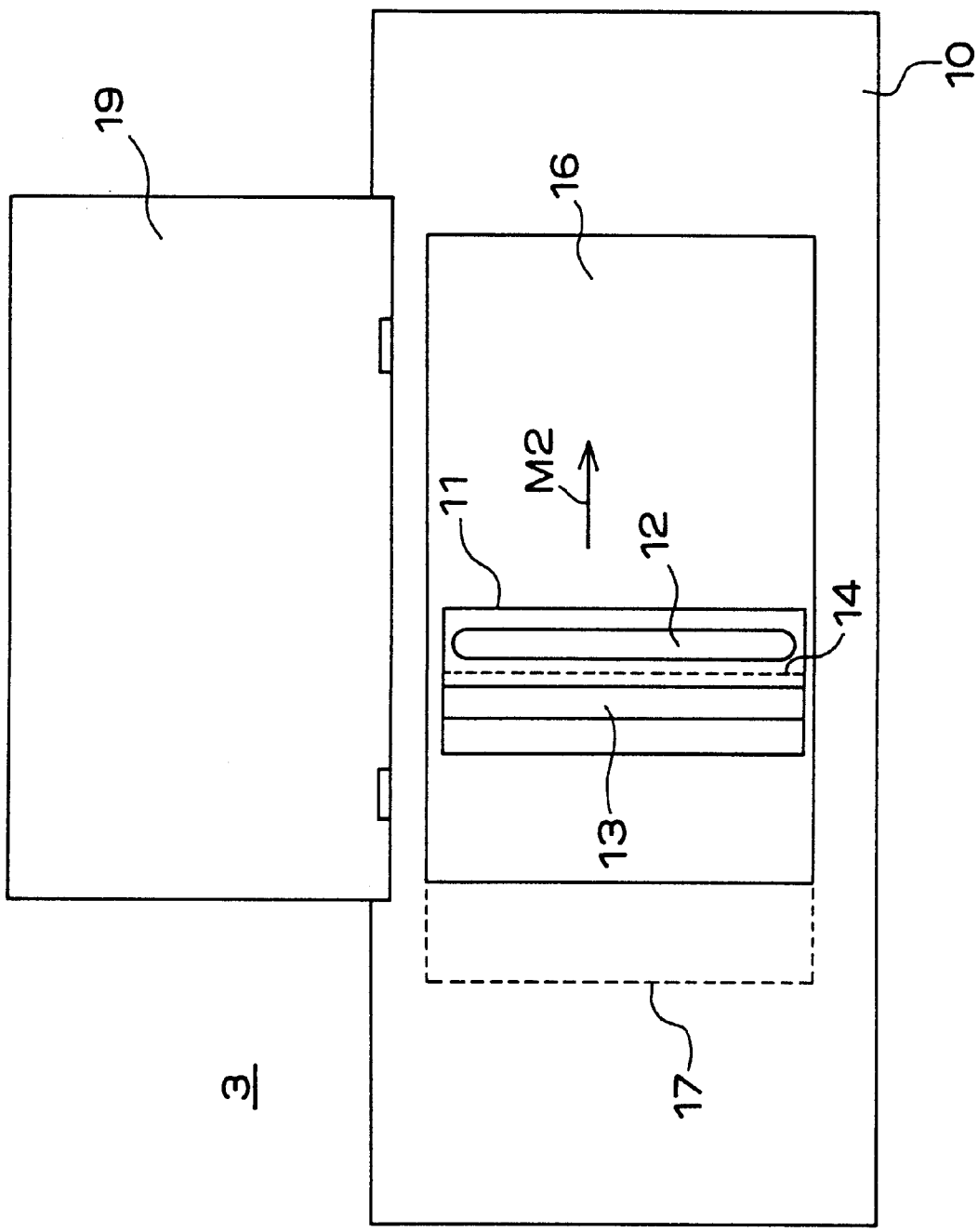
FIG. 4 is a top plan view of an image reader thereof.

Referring now to FIG. 4, the document cover 19 is pivotal about a horizontal axis so that the document may be releasably secured between the platen 16 and the document cover 19.

The lamp 12 and the CCD sensor 14 extend substantially entirely across the platen 16. A standard white plate 17 for use in shading correction is disposed on the left-hand side of the platen 16 as viewed in FIG. 4.

Referring again to FIG. 3, the scanner 11 is driven by means of a motor 15 when reading the document. When the scanner 11 is moved in one direction as indicated by an arrow M1, the document is scanned once for each of yellow (Y), magenta (M), cyan (C) and black (K). The CCD sensor 14 is provided with filters for red (R), green (G) and blue (B) respectively. These three colors are read in a single process of scanning.

Light rays reflected from the document are subjected to photoelectric transfer in the CCD sensor 14, from which the control unit 100 fetches a many-valued signal indicating R, G and B. When the copying machine 3 is used as a printer, the aforesaid many-valued signal to be fetched by the control unit 100 takes the form of an image file DF to be received from an external device.

In a picture signal processing unit 120 (FIG. 7) incorporated in the printing station 20 (FIG. 3), the many-valued signal fetched by the control unit 100 is converted into data on the photographic densities of Y, M, C and K so that an optimum image may be reproduced.

In a printer control 130 (FIG. 7) incorporated in the control unit 100, the data on the photographic densities of Y, M, C and K are subjected to $\gamma$ correction and processing to be carried out by the dither method. These correction and processing are carried out in accordance with the gradient of a photographic material. Then the data are transmitted as output control signals to a print head 21, which includes an optical radiation source such as a laser diode emitting radiation with intensities based on the aforesaid data as indicated by the output control signals. The surface of a photoconductive drum 22 is illuminated by this radiation.

Prior to the illumination of the photoconductive drum 22, a cleaner 23 removes residual toner particles from the surface, and a discharge lamp 24 floods the surface of the photoconductive drum 22 to dissipate any residual electrostatic charge remaining thereon. Then a corona generating device 25 charges the surface of the photoconductive drum 22, on which an electrostatic latent image is recorded when the light images of the original document are focused thereon.

A development station 26 comprises processors 26a to 26d for M, C, Y and K respectively and is displaceable vertically with respect to the photoconductive drum 22 synchronously with the rotation thereof so that each of different colors of which the electrostatic latent image is composed may be selected and developed by each of the processors 26a to 26d.

Trays 32 and 33 provide storages for those sheets of different sizes on which an image will be subsequently printed. The trays 32 and 33 are provided respectively with photoelectric sensors 37 and 38 for checking that the size of a copy sheet which is going to be supplied from either of the trays 32 and 33 to an imprint drum 28 conforms either to an instruction given by a user or to a command received from the printer control 130. The leading end of a copy sheet supplied from either of the trays 32 and 33 is held by a chuck 34 provided on the surface of the imprint drum 28. At the same time, an electrostatic generator 35 causes the leading end of the copy sheet to electrostatically adhere to the surface of the imprint drum 28. Thus, when the copy sheet is going to be brought into engagement with the surface of the imprint drum 28, the chuck 34 and the electrostatic generator 35 prevent the copy sheet from being improperly positioned thereon. By virtue of a corona generating device 27, an image developed on the surface of the photoconductive drum 22 is imprinted on the copy sheet brought into engagement with the surface of the imprint drum 28.

When the aforesaid printing process has been individually executed for M, C, Y and K, a claw 29 is brought into an operative position so that the copy sheet may be moved away from the imprint drum 28.

At a fixing station 30, the transferred toner powder image is permanently affixed to the copy sheet, which is then discharged from the fixing station 30 to a delivery tray 31.

Figure 5:
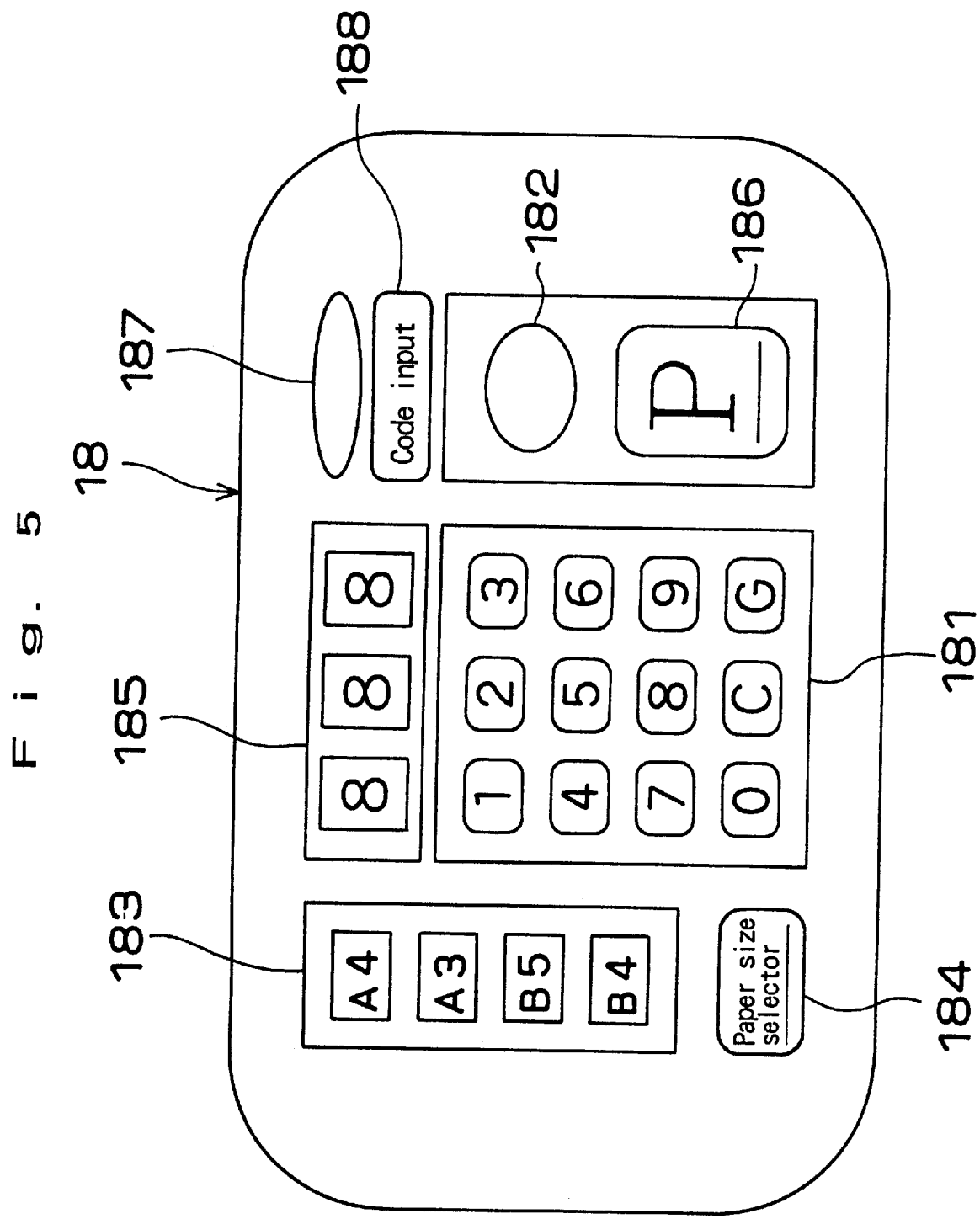
FIG. 5 is a detail view of a control panel thereof.

Referring now to FIG. 5, the control panel 18 comprises a ten-button key set 181, indicator 182 for indicating that the copying machine 3 is or is not ready for printing, paper size indicator 183, paper size selector key 184, indicator 185 for indicating the number of copy sheets set by the operator, start key 186 for giving a command to start copying or printing, indicator 187 for indicating that the copying machine 3 is in a mode adapted to input the data code DC and the ID code UC via the ten-button key set 181, and code input key 188.

When the copying machine 3 is used for copying, the ten-button key set 181 is used to input the number of copy sheets set by the operator. When the copying machine 3 is used for printing, the ten-button key set 181 is used to input the data code DC and the ID code UC. The code input key 188 is used for setting and canceling the mode adapted to input the data code DC and the ID code UC via the ten-button key set 181.

The off state of the indicator 187 indicates that the copying machine 3 can be used for copying, while the on state of the indicator 187 indicates that the copying machine 3 can be used for printing. In the latter case, the codes entered via the ten-button key set 181 are stored in the memory 131 (FIG. 2). The indicator 187 is flickered when the data code DC has been entered. The code entered thereafter via the ten-button key set 181 is regarded as the ID code UC and stored in the memory 131.

Referring again to FIG. 3, the vending station 200 includes a vendor control 210 and a vendor panel 220.

Figure 6:
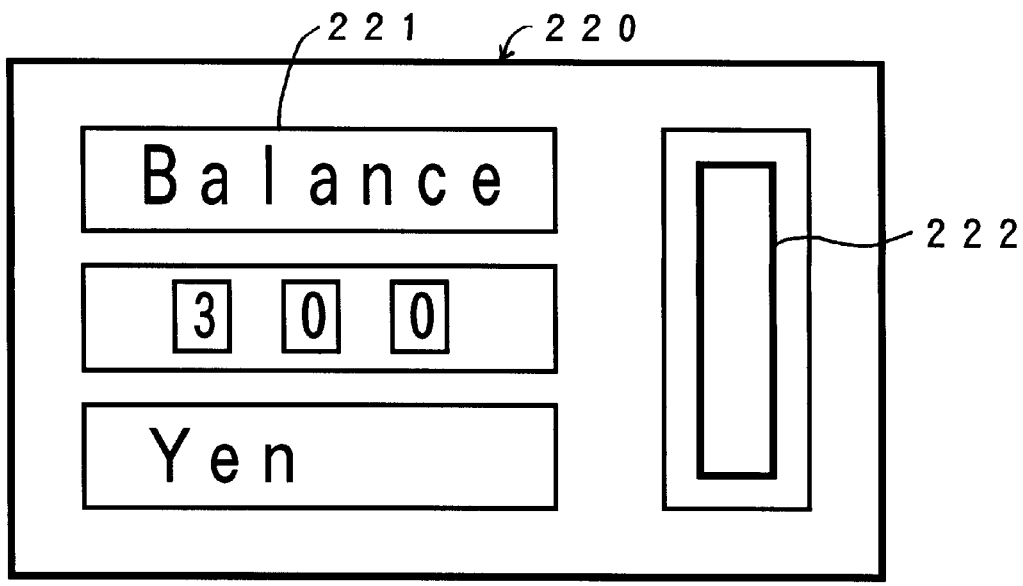
FIG. 6 is a detail view of a vendor panel thereof.

The vending station 200 is controlled by the vendor control 210, which in turn is connected to the control unit 100. As shown in FIG. 6, the vendor panel 220 comprises a coin slot 222 and an indicator 221 for indicating the balance.

Reference will now be had to the control unit 100.

Figure 7:
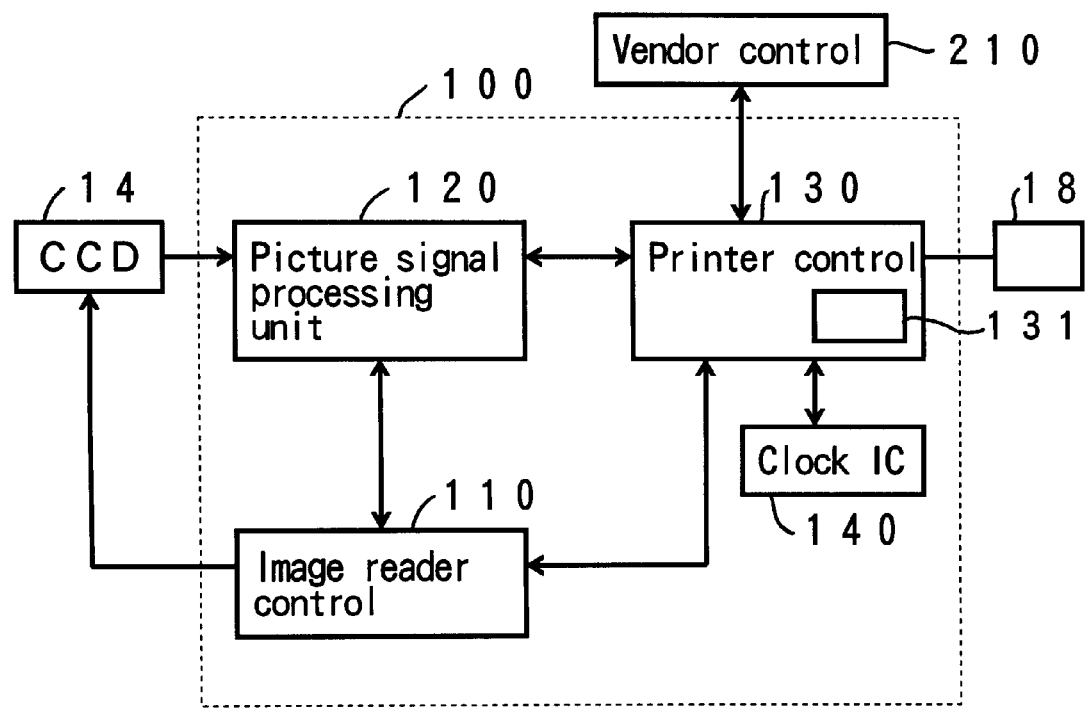
FIG. 7 is a block diagrammatic representation of a control unit incorporated therein.

As shown in FIG. 7, the control unit 100 comprises an image reader control 110, picture signal processing unit 120, printer control 130, and clock IC 140.

The image reader control 110 controls the image reading station 10 (FIG. 3). More specifically stated, the image reader control 110 actuates the CCD sensor 14, effects on-off control over the lamp 12, and drives the scanner 11 by means of the motor 15.

The picture signal processing unit 120 receives picture signals for R, G and B from the CCD sensor 14 and converts them into image data on Y, M, C and K so that an optimum image may be reproduced.

The printer control 130 controls the printing station 20. More specifically stated, the printer control 130 controls the output of the print head 21 by subjecting the aforesaid image data to $\gamma$ correction and, if necessary, processing to be carried out by a many-valued dither method for expressing the gradation. The printer control 130 further controls synchronism among the paper feeding operation of the tray 32 or 33, the rotation of the drums 22 and 28, the vertical displacement of the development station 26, and the energization of the corona generating device 25 and the electrostatic generator 35.

Figures 8, 9:
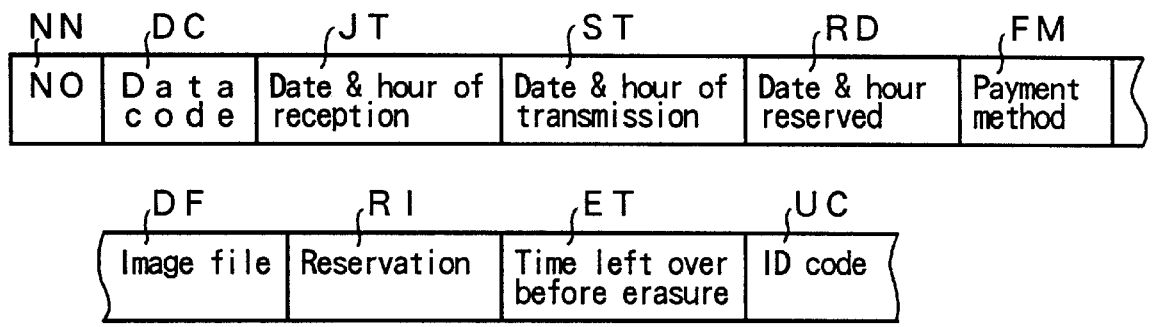
FIG. 8 provides a diagrammatic illustration of an example of information stored in the second data processor.
FIG. 9 is a view to help explain the relationship between the data codes and the ID codes.

Reference will now be had to the information PD, an example of which is indicated by the reference numeral PD1 in FIG. 8 and includes a data code DC, date and hour JT when the second data processor 4 receives the information PD, date and hour ST when the image file DF is transmitted to the copying machine 3 involved, date and hour RD reserved for printing, payment method FM, image file DF, reservation RI, time ET left over before the information PD is erased from the storage device 41, and ID code UC.

In order to distinguish one of his or her own image files DF from another, a user gives a data code DC to each of his or her own image files DF. A code which is easy to memorize is suitable for use as the data code DC. Attention has to be given to the fact that one user's image file may possibly have the same data code as another user's image file. Although data codes commonly in use consist of Arabic numerals, it is also possible to use the letters of the alphabet. It is contemplated in this embodiment that Arabic numerals alone are used for the data codes so as to make it possible to input data codes via the ten-button key set 181. The name of the image file DF per se may be used as the data code DC. The data code is sometimes referred to as the "user's code".

The data code DC need not be kept secret. From among a plurality of data codes DC displayed on the screen of a copying machine 3, a user selects one representing his or her image file DF on the basis of which he or she wishes to print out an image in hard copy. In addition to the data code DC, however, it is necessary to input an ID code UC in order to actually allow the copying machine 3 to execute a printing process.

An ID code UC is allotted to each user and must be kept absolutely secret. An important feature of this embodiment is that, every time the second data processor 4 receives a single piece of information PD from a first data processor 5, the second data processor 4 regards such a single piece of information PD as belonging to a user and allots an ID code UC thereto. As an alternative to a single piece of information PD, a single image file DF may be regarded as belonging to a user.

The ID code UC automatically produced in the aforesaid manner is stored in the second data processor 4 as a part of the information PD and transmitted therefrom to the first data processor 5 in reply to the receipt of the information PD from the first data processor 5.

The allotment of an ID code UC to a single piece of information PD applies even to the case where a plurality of data codes DC (i.e. image files DF) are contained in a single piece of information PD.

The user has to input the ID code UC to the copying machine 3 in order to actually allow the copying machine 3 to execute a printing process. Thus the ID code UC is a very effective protection against unauthorized printing.

Although the ID code UC may consist of Arabic numerals and/or the letters of the alphabet, it is contemplated in this embodiment that Arabic numerals alone are used for the ID codes so as to make it possible to input ID codes via the ten-button key set 181.

Referring now to FIG. 9, Nos. 1 to 4 are given respectively to four pieces of information PD, the first of which contains three image files A, B and C, for all of which a single ID code 1234 is produced, allotted to a user by whom the information No. 1 has been entered, and linked to all of three data codes 111, 222 and 333.

The user must bear the data code DC and the ID code UC linked thereto well in his or her mind. Instead of relying on memorization, it is also possible to make a note of them when they are displayed on the screen of the display 51 or, as is the case with this embodiment, to record them in the storage medium MM1 or MM2, which is inserted into the reader 39 so that the data code DC and the ID code UC may be read therefrom.

The provision of the reader 39 serves to avoid the necessity of memorizing or making a note of the data code DC and the ID code UC and the necessity of manual input to the copying machine 3 through the control panel 18 and thereby serves to prevent unintentional printout from being caused by a slip of memory or a slip of input.

Referring again to FIG. 8, the date and hour JT is automatically recorded to the extent of minutes by an internal clock incorporated in the second data processor 4. The date and hour ST is also recorded to the extent of minutes. The time RD for printing can be specified either in terms of a date alone or in terms of the date and hour to the extent of minutes. A user who has specified the time RD in the former manner is regarded as being going to come to the convenience store at night.

"Prepaid", "deferred" or "transferred" can be specified as the payment method FM. "Prepaid" and "transferred" denote payment made at the time of transmitting the information PD from the first data processor 5 to the second data processor 4. Various methods of payment, e.g. those utilizing data communication or a transfer account, may be used for "prepaid" and "transferred". In these two cases, payment for printing is made at the moment when, e.g., an ID code UC is allotted to the information PD transmitted to the second data processor 4. An advantage such as the elongation of the length of time for which the information PD is retained in the second data processor 4 may be obtained from the prepayment. "Deferred" payment means that a coin or coins are inserted into the coin slot 222 (FIG. 6) at the time of actually allowing the copying machine 3 to execute a printing process.

Intrinsically, image data per se should be recorded at the location allotted to the image file DF. However, in view of the fact that image data are much larger in quantity than other data, only the name of the image file DF may be recorded, with the image data per se retained at another location. "Erased" is recorded when the image file DF has been erased. With respect to the reservation RI, "made" or "not made" is recorded. The time ET is displayed to the extent of minutes.

Figure 10:
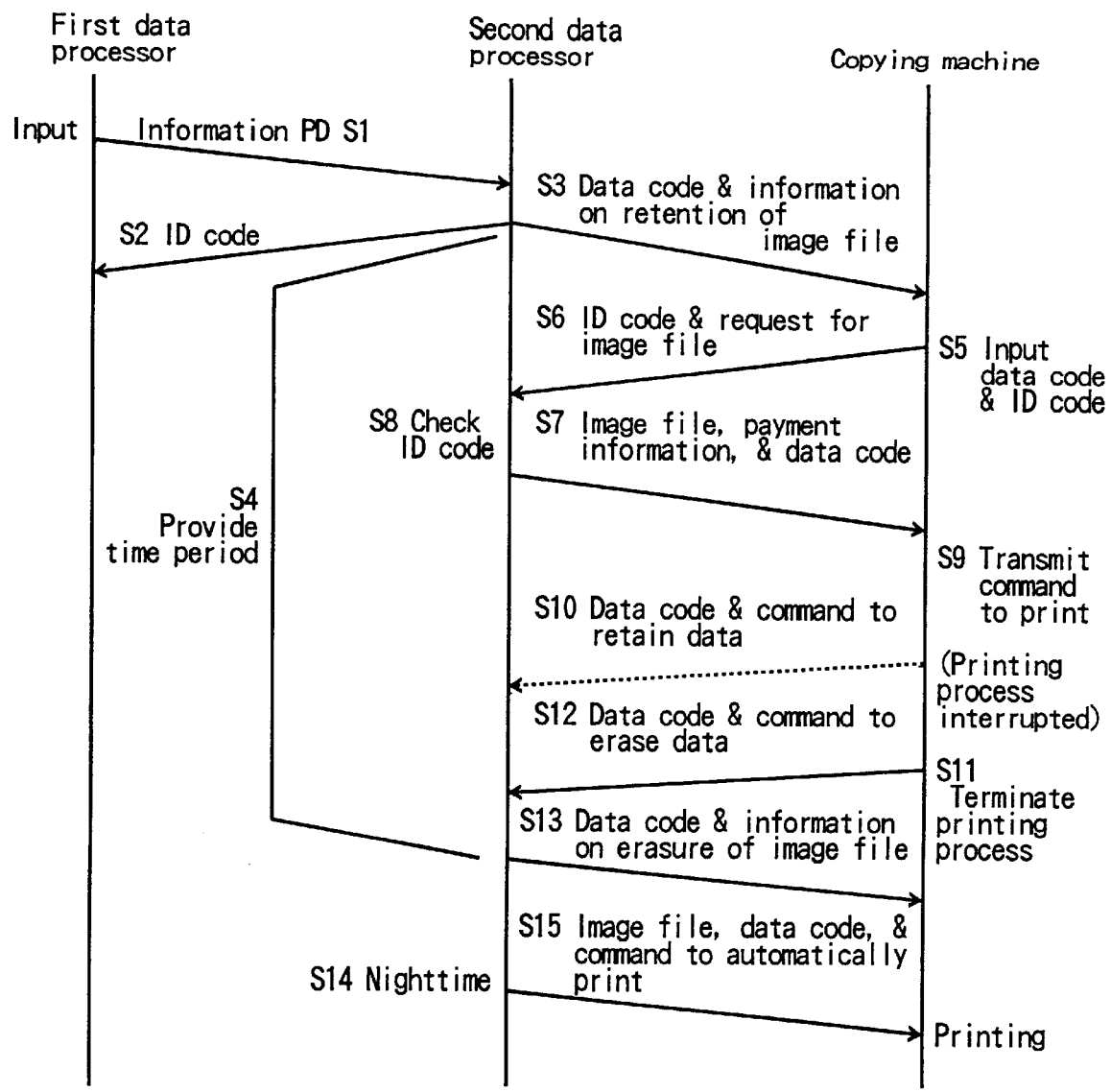
FIG. 10 is a sequence diagram of the printing system.

For a more complete understanding of the successive steps in a typical operation of the printing system 1, reference may be had to FIG. 10. In order to make a request for printing, information PD containing an image file DF on the basis of which a user wishes to print out an image in hard copy is transmitted from a first data processor 5 to the second data processor 4 (S1). Simultaneously with this transmission, payment for printing may be made to the second data processor 4 by the utilization of electronic data communication.

On receipt of the information PD, the second data processor 4 produces an ID code UC to be allotted thereto and transmits the same to the first data processor 5 from which the information PD has been received (S2). Then the ID code UC is displayed on the screen of the display 51 of the first data processor 5 and stored by the user in his or her storage medium MM1 or MM2, in the contingent absence of which he or she memorizes the ID code UC.

Simultaneously with the transmission of the ID code UC from the second data processor 4 to the first data processor 5, information that the second data processor 4 retains the image file DF is transmitted therefrom to the copying machine 3 together with the data code DC, date and hour RD reserved for printing, and payment method FM (S3). These pieces of information are stored in the memory 131.

Then a time period begins to elapse, at the end of which the information PD is to be erased (S4). At the end of this time period, the data code DC and the image file DF to which it has been given are erased. Information that they have been erased is transmitted to the copying machine 3 involved (S13).

The user takes the aforesaid storage medium MM1 or MM2 in which the ID code UC is stored, and goes to the convenience store or the like in which the copying machine 3 involved is installed.

The storage medium MM1 or MM2 is inserted into the reader 39 so that the data code DC and the ID code UC may be read therefrom (S5). In the contingent absence of the storage medium MM1 or MM2, the user manually inputs the data code DC and the ID code UC to the copying machine 3 through the control panel 18.

On receipt of the data code DC, the copying machine 3 checks whether or not an identical data code is stored in the memory 131. When an identical data code is found to be stored in the memory 131, the copying machine 3 requests the second data processor 4 to transmit the image file DF. This request is accompanied by the ID code UC (S6).

On receipt of the aforesaid request, the second data processor 4 collates the ID code UC stored in the storage device 41 with the ID code UC received from the copying machine 3 and checks whether or not the former agrees with the latter (S8). In case of agreement, the image file DF to which the ID code UC has been allotted is transmitted to the copying machine 3, together with the data code DC and information on whether or not payment for printing has already been made (S7).

The image file DF is not transmitted to the copying machine 3 when the ID code UC stored in the storage device 41 does not agree with the ID code UC received from the copying machine 3. Such an arrangement is particularly useful for preventing the user from obtaining a printout on the basis of a wrong image file and for preventing an unauthorized person from stealthily obtaining a printout on the basis of the image file DF.

When the start key 186 (FIG. 5) is pushed by the user, the copying machine 3 begins to print out an image on the basis of the specified image file DF (S9), provided that payment for printing is made either beforehand by the utilization of a transfer account or in the site of the copying machine 3 by inserting a coin or coins into the coin slot 222 (FIG. 6).

When the printing process in the copying machine 3 comes to an end (S11), a command to erase data is transmitted from the copying machine 3 to the second data processor 4. This command is accompanied by the data code DC (S12). On receipt of this command, the second data processor 4 erases from the storage device 41 the information PD containing the data code DC. Such erasure makes it possible to effectively utilize memory locations in the storage device 41.

When the printing process is interrupted because, e.g., the copying machine 3 has run out of copy sheets, a command to retain data is transmitted from the copying machine 3 to the second data processor 4 (S10). On receipt of this command, the second data processor 4 brings the timer to a halt or elongates the length of time for which the information PD is retained.

The information PD is forcedly erased from the storage device 41 at the moment when the time which has been set in the timer is up, irrespective as to whether or not the information PD contains an image file or files on the basis of which a printing process has not been executed yet.

Some of the users have an eye on the nighttime because lower rates than the daytime rates are granted for printing and only a small number of persons come to the convenience store for using the copying machine 3. When a user has specified either the nighttime or the time RD in terms of a day alone, a command to automatically execute a printing process is transmitted at night from the first data processor 5 to the second data processor 4 (Sl4).

The aforesaid command is transferred from the second data processor 4 to the copying machine 3. At the time of transfer, this command is accompanied by the data code DC and the image file DF (S15). On receipt of this command, the copying machine 3 prints out an image on the basis of the specified image file DF. Information such as the data code DC may be automatically added to the printed image. The hard copy is delivered later on to the user in exchange for payment for printing. A user who has already paid for printing can receive the hard copy by presenting the data code DC and the ID code UC.

The manner in which the printing system 1 works will now be described with reference to FIGS. 11 to 18.

The execution of processing shown in FIGS. 11 to 14 is enabled by the program BP stored in the storage device 41 incorporated in the second data processor 4.

Figure 11:
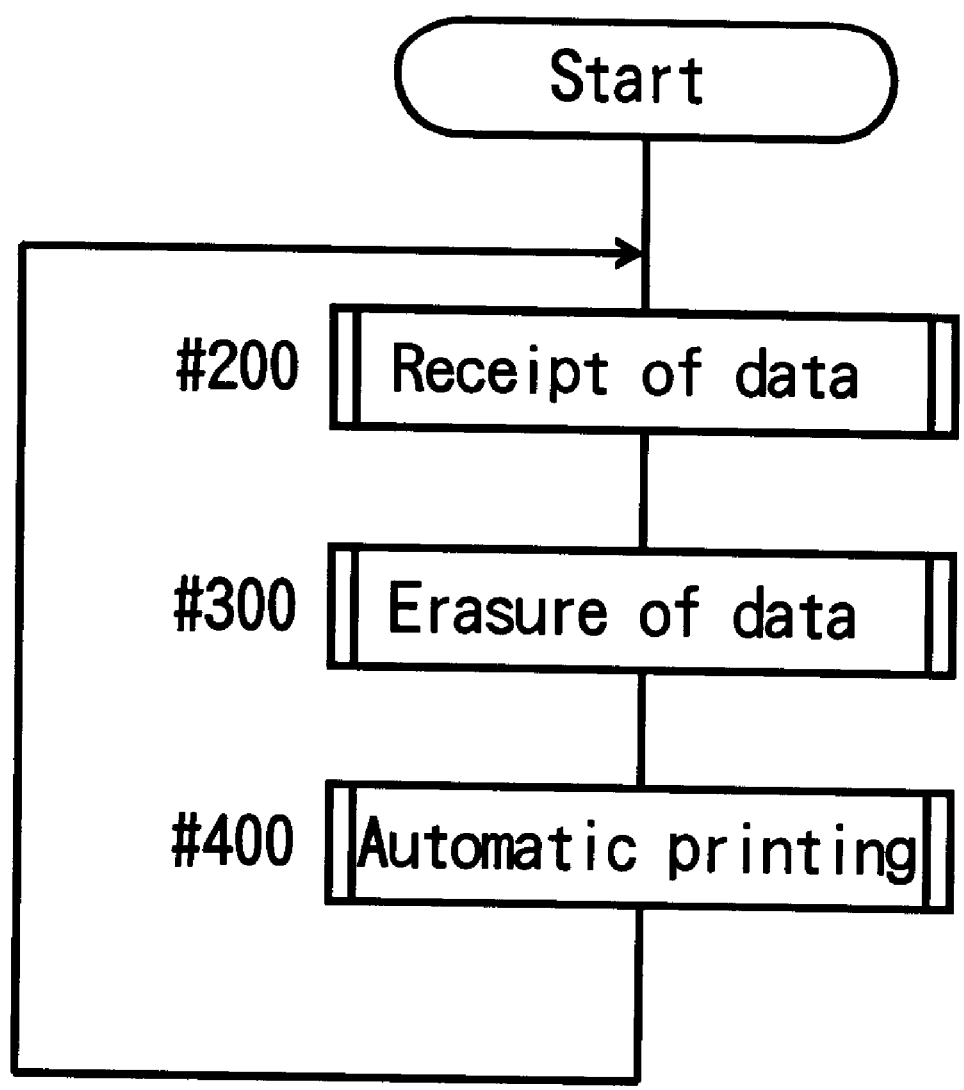
FIG. 11 is a flow diagram representing successive steps in a typical operation of the second data processor.

Referring now to FIG. 11, the second data processor 4 receives data from a first data processor 5 and a copying machine 3 (step 200), erases data from the storage device 41 (step 300), and transfers to the copying machine 3 a command to automatically execute a printing process at night when the user has specified either the nighttime or the time RD in terms of a day alone (step 400).

Figure 12:
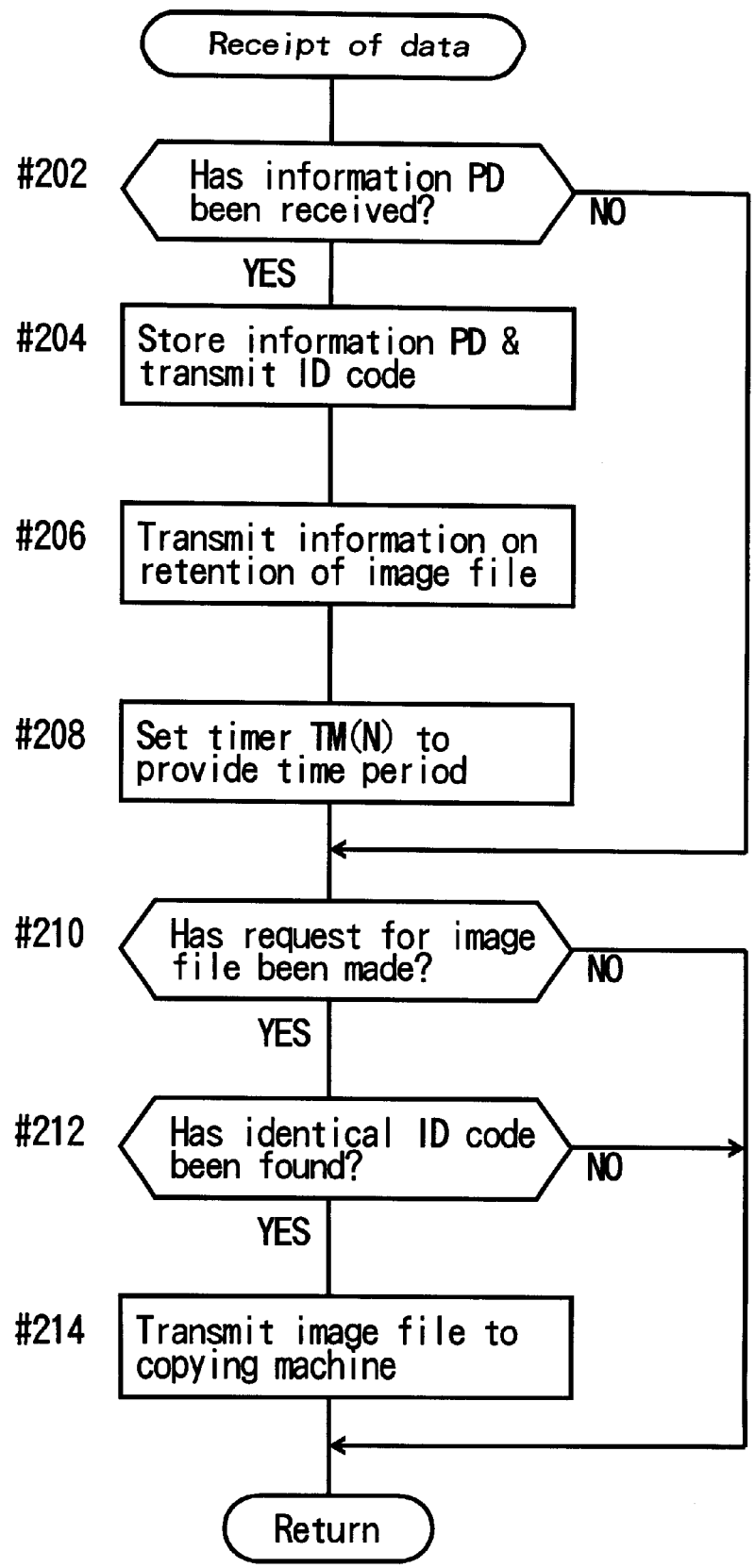
FIG. 12 is a detail showing a portion of FIG. 11 in connection with the receipt of data from the copying machine and the first data processor.

FIG. 12 is a detail showing a portion of FIG. 11 in connection with the receipt of data from the first data processor 5. When the information PD is received therefrom (i.e., when an affirmative answer is given in step 202), the information PD together with the date and hour JT is stored in the storage device 41. An ID code UC is produced and transmitted to the first data processor 5 (step 204). Information that the second data processor 4 retains the image file DF is transmitted therefrom to the copying machine 3 together with the data code DC (step 206). In the copying machine 3, the data code DC is stored in the memory 131, and one of timers TM(N) adapted to be allotted to respective users is set to provide a certain time period, at the end of which the information PD is to be erased. This time period begins to elapse (step 208).

When the second data processor 4 is requested to transmit the image file DF to the copying machine 3 (i.e., when an affirmative answer is given in step 210), the second data processor 4 checks whether or not an ID code identical with the ID code UC which has accompanied the aforesaid request is stored in the storage device 41 (step 212). When an identical ID code is found to be stored in the storage device 41, the image file DF to which the ID code UC has been allotted is transmitted to the copying machine 3, together with the data code DC and information on whether or not payment for printing has already been made (step 214).

Figure 13:
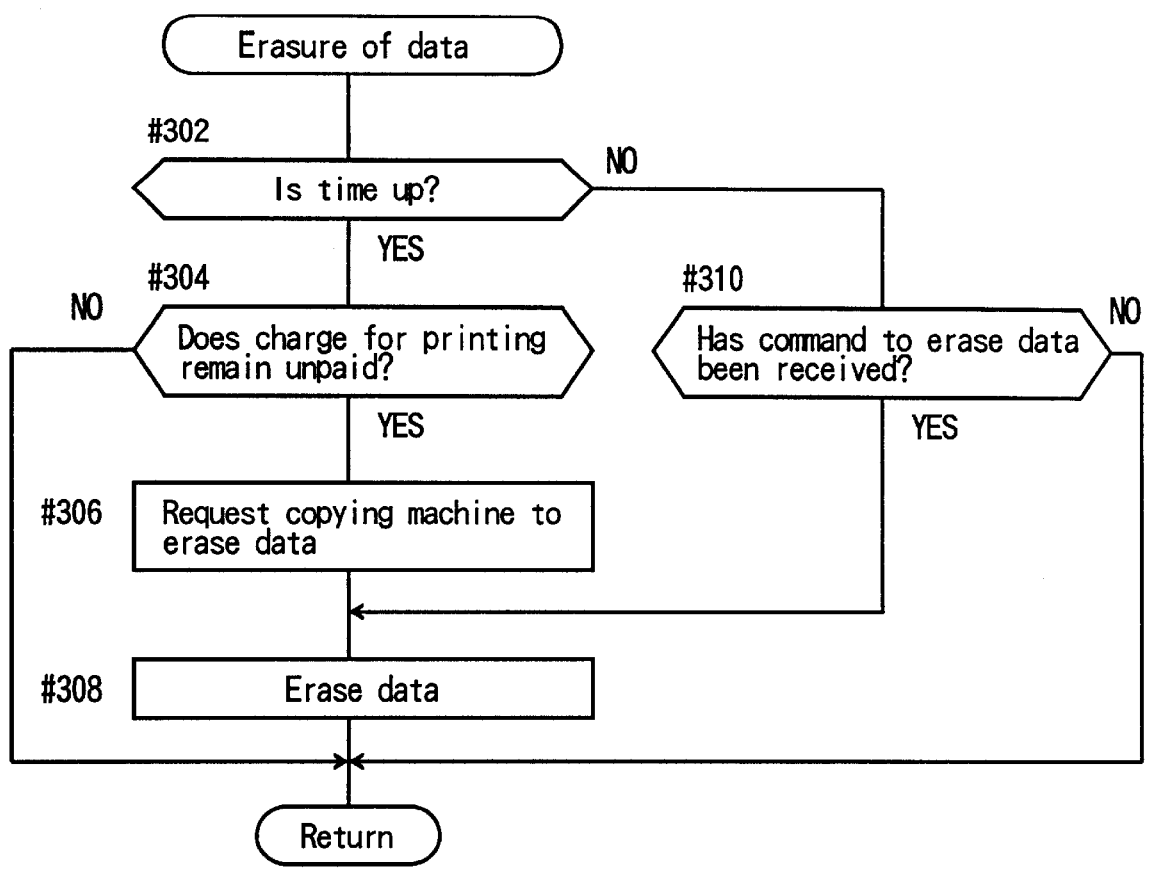
FIG. 13 is a detail showing a portion of FIG. 11 in connection with the erasion of data.

FIG. 13 is a detail showing a portion of FIG. 11 in connection with the erasure of data. When the time which has been set in the timer TM(N) is up (i.e., when an affirmative answer is given in step 302), the second data processor 4 passes a judgment on whether or not payment for printing has already been made (step 304). If payment for printing has not been made yet, the second data processor 4 requests the copying machine 3 to erase the data code DC (step 306). The information PD stored in the storage device 41 incorporated in the second data processor 4 is also erased (step 308).

If payment for printing has already been made (i.e., when a negative answer is given in step 304), the second data processor 4 does not request the copying machine 3 to erase the data code DC and does not erase the information PD stored in the storage device 41. A user who pays in advance for printing can execute a printing process whenever he or she likes, or obtain an advantage such as the elongation of the length of time for which the information PD is retained in the second data processor.

When the time which has been set in the timer TM(N) has not been up yet (i.e., when a negative answer is given in step 302), the second data processor 4 passes a judgment on whether or not a command to erase data has already been received from the copying machine 3. The processing proceeds to step 308 if the command has already been received.

Figure 14:
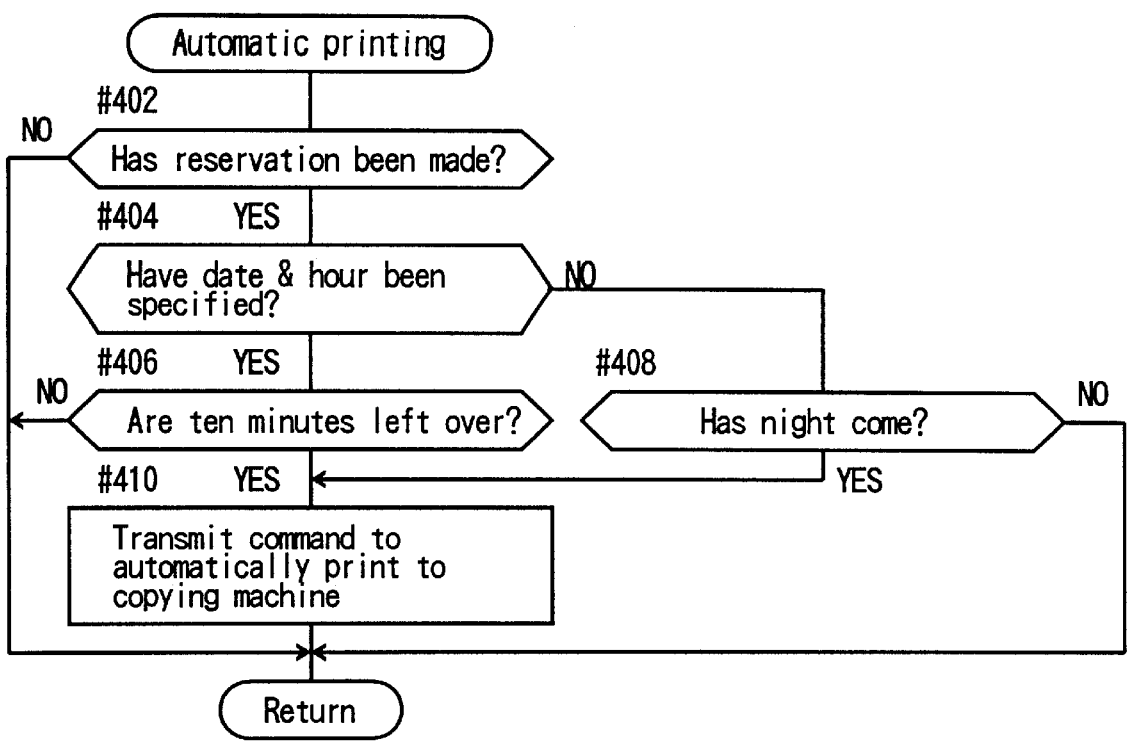
FIG. 14 is a detail showing a portion of FIG. 11 in connection with the command to automatically print an image.

FIG. 14 is a detail showing a portion of FIG. 11 in connection with the automatic execution of a printing process. The second data processor 4 checks whether or not a user or users have already made reservation (step 402). When a user or users have already made reservation, the second data processor 4 passes a judgment on whether or not the date and hour RD have been specified (step 404).

If the date and hour RD have been specified and if a moment has come when ten minutes are left over before the specified hour RD (i.e., when an affirmative answer is given in step 406), the information PD together with a command to automatically execute a printing process is transmitted from the second data processor 4 to the copying machine 3 (step 410).

Instead of transmitting the aforesaid command, it is also possible to transmit the image file DF alone so as to obviate the necessity for a user to wait for the image file DF by the side of the copying machine 3.

If a user has already made reservation but the hour RD has not been specified yet, the second data processor 4 passes a judgment on whether or not night has come (step 408). For example, the time interval between 10 p.m. and 3 a.m. may be defined as night. If the judgment is that night has come (i.e., when an affirmative answer is given in step 408), the image file DF together with a command to automatically execute a printing process is transmitted from the second data processor 4 to the copying machine 3 (step 410).

The execution of processing shown in FIGS. 15 to 18 is enabled by the program CP stored in the memory 131 incorporated in the copying machine 3 involved.

Figure 15:
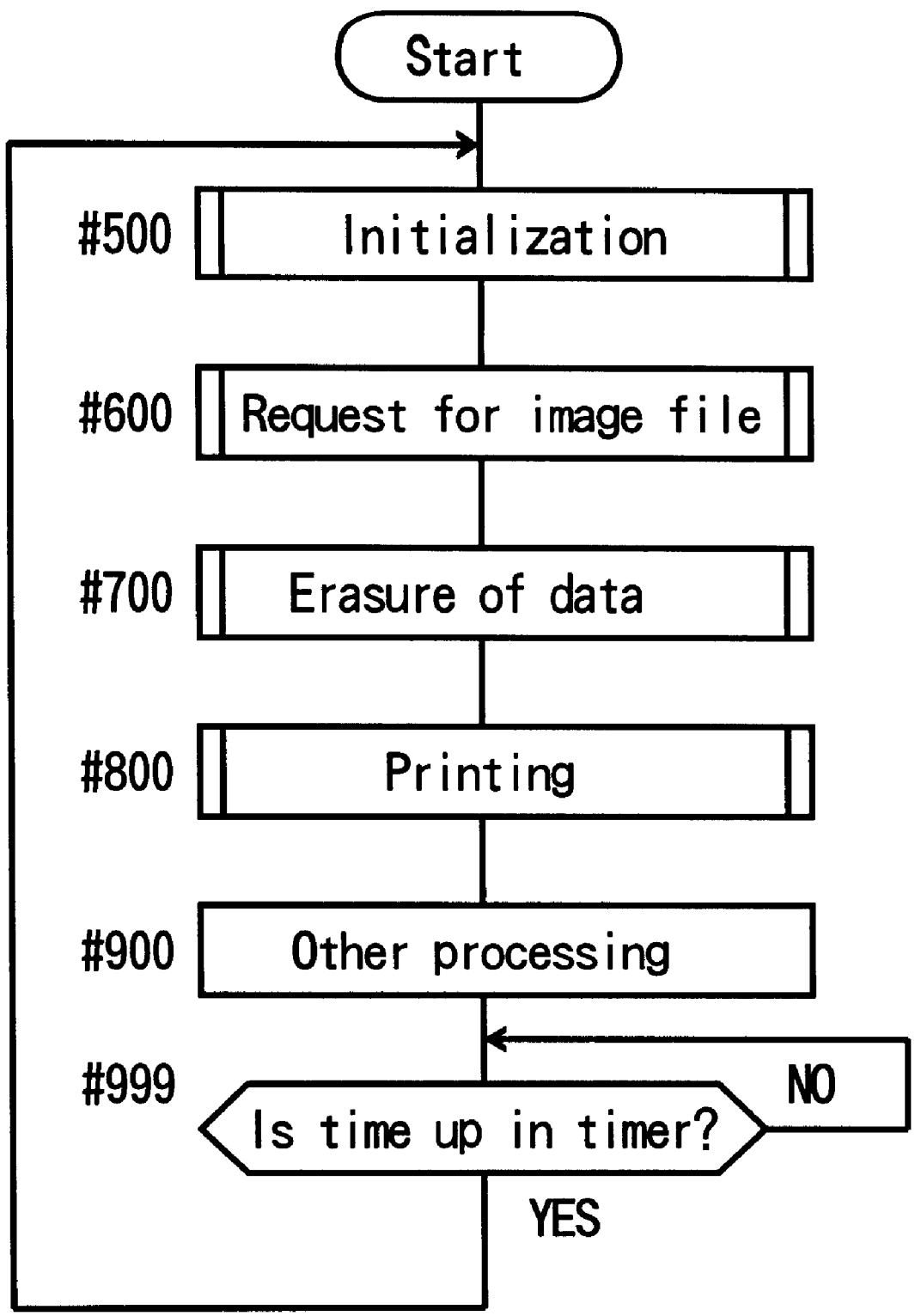
FIG. 15 is a flow diagram representing successive steps in a typical operation of the copying machine.
Figure 16:
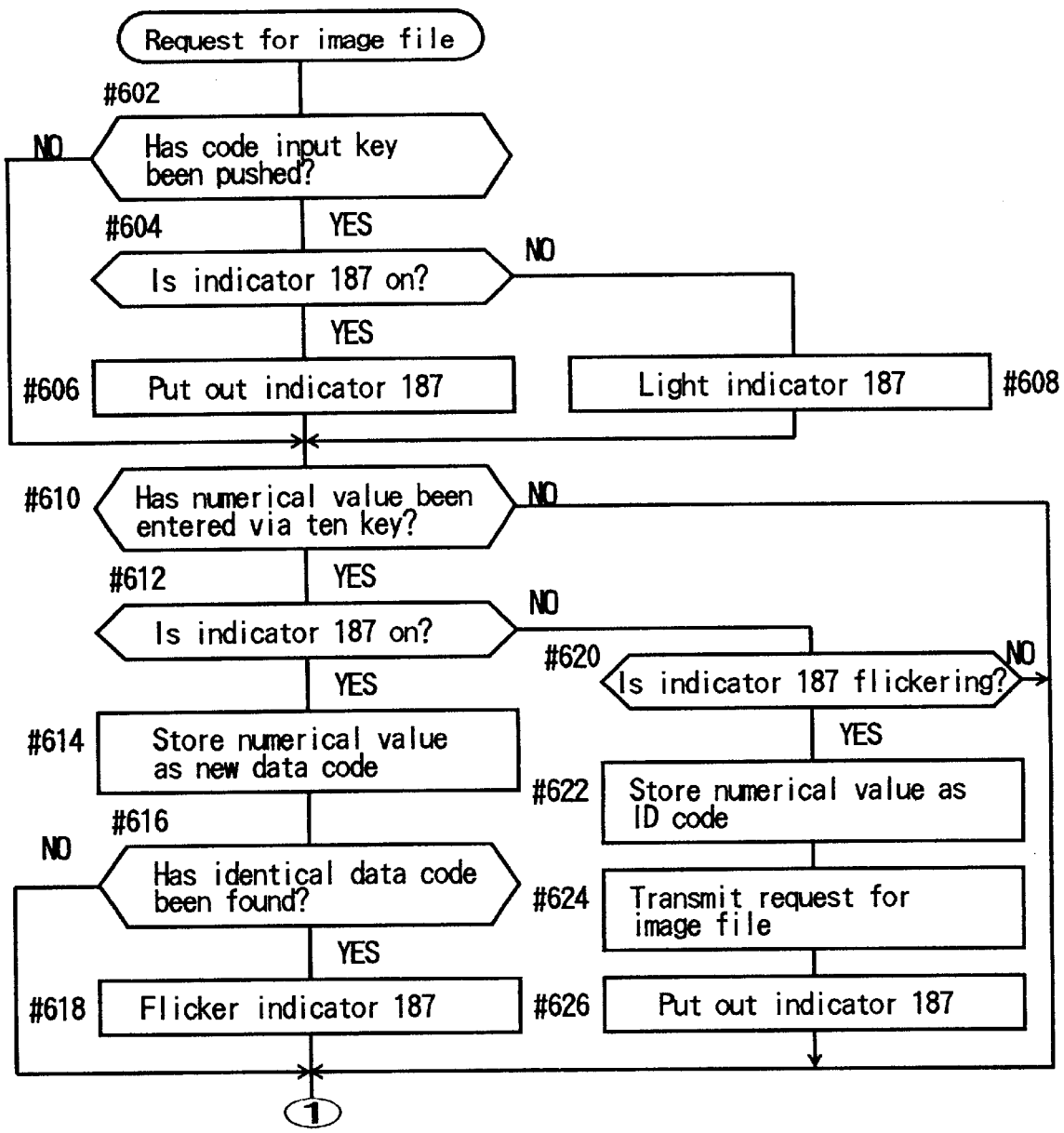
FIG. 16(A) and FIG. 16(B) are details showing a portion of FIG. 15 in connection with the request for an image.
Figure 16:
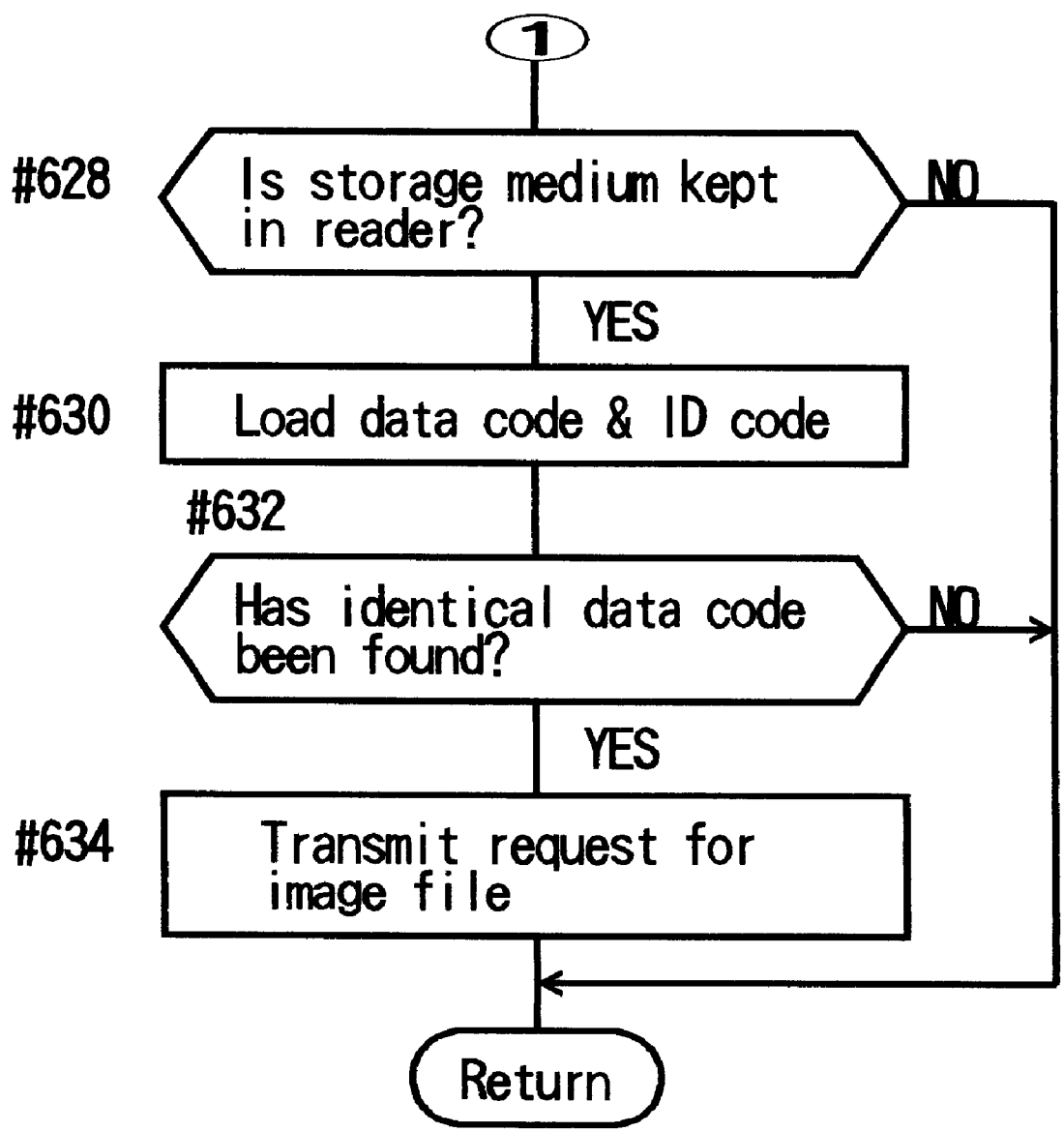

Referring now to FIG. 15, the power circuit to the copying machine 3 is closed, and a timer for providing a certain time period required for executing a routine is set (step 500). Then the copying machine 3 requests the second data processor 4 to transmit an image file DF (step 600), erases an old image file DF, etc. (step 700), receives the new image file DF from the second data processor 4 and executes a printing process on the basis thereof (step 800), and carries out other processing (step 900). The processing returns to step 500 when the preset time period has elapsed (i.e., when an affirmative answer is given in step 999).

FIG. 16(A) and FIG. 16(B) are details showing a portion of FIG. 15 in connection with the request for the transmission of an image file DF. The copying machine 3 passes a judgment on whether or not the code input key 188 (FIG. 5) provided on the control panel 18 has been pushed (step 602). Every time the code input key 188 is pushed, the indicator 187 changes from the on state to the off state and vice versa (steps 604, 606 and 608). The on state of the indicator 187 indicates that the copying machine 3 is in a mode adapted to input the data code DC and the ID code UC via the ten-button key set 181.

A numerical value is entered via the ten-button key set 181 (step 610). If this input procedure is carried out while the indicator 187 is on (i.e., when an affirmative answer is given in step 612), the numerical value is stored in the memory 131 as a new data code DC (step 614). The copying machine 3 checks whether or not an old data code identical with this new data code DC is present in the memory 131. When an identical data code is found to be present in the memory 131 (i.e., when an affirmative answer is given in step 616), the indicator 187 is flickered (step 618).

If the aforesaid input procedure is carried out while the indicator 187 is flickering (i.e., when affirmative answers are given in steps 610 and 620 and a negative answer is given in step 612), the numerical value is stored in the memory 131 as an ID code UC (step 622), and the copying machine 3 requests the second data processor 4 to transmit the image file DF (step 624). Then the indicator 187 is put out (step 626).

If the storage medium MM1 or MM2 is found to be kept in the reader 39 (step 628), the data code DC and the ID code UC are transferred therefrom (step 630). The copying machine 3 checks whether or not an old data code identical with the newly transferred data code DC is present in the memory 131. When an identical data code is found to be present in the memory 131 (i.e., when an affirmative answer is given in step 632), the copying machine 3 requests the second data processor 4 to transmit the image file DF (step 634).

Figure 17:
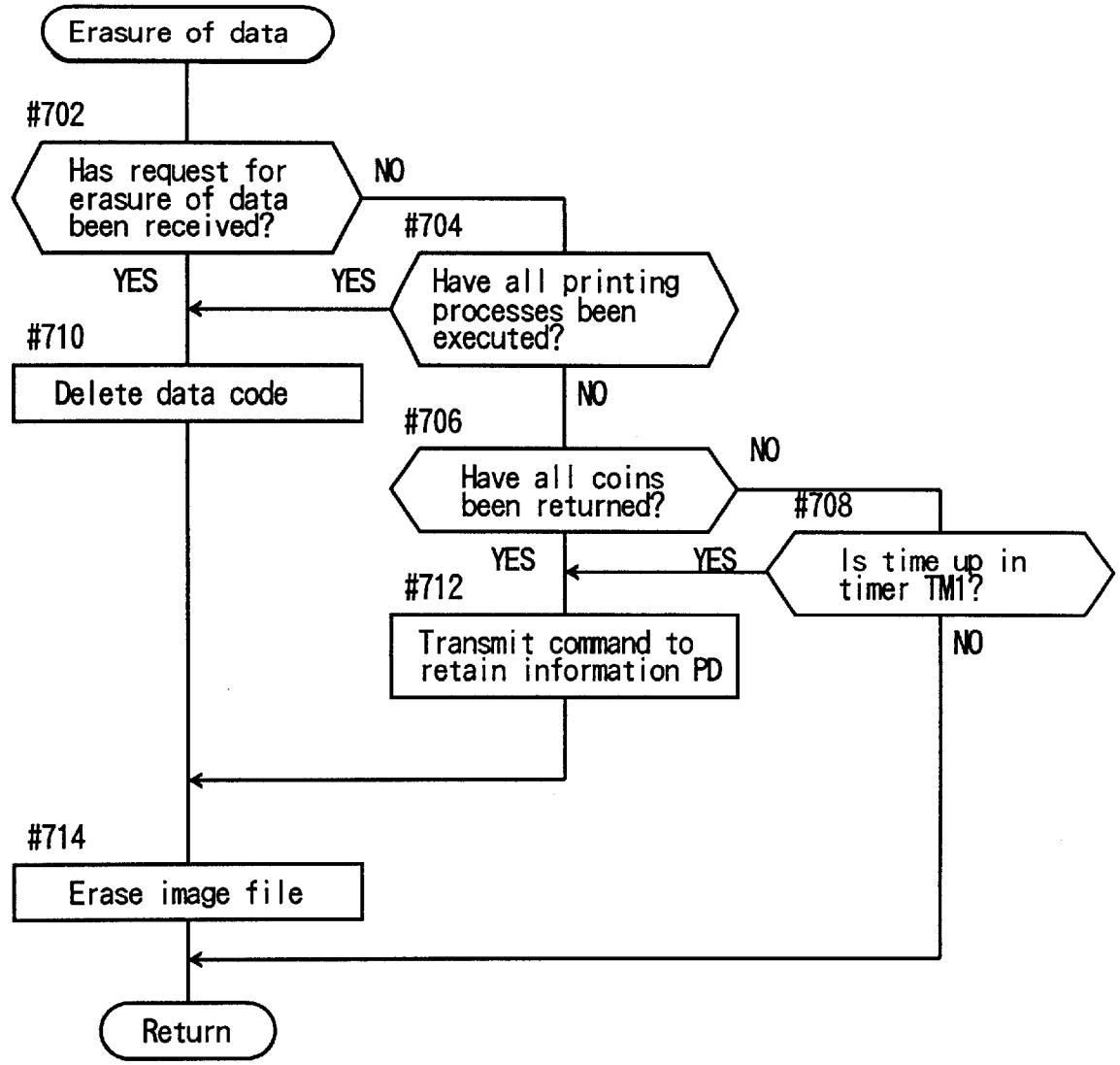
FIG. 17 is a detail showing a portion of FIG. 15 in connection with the erasion of data.
Figure 18:
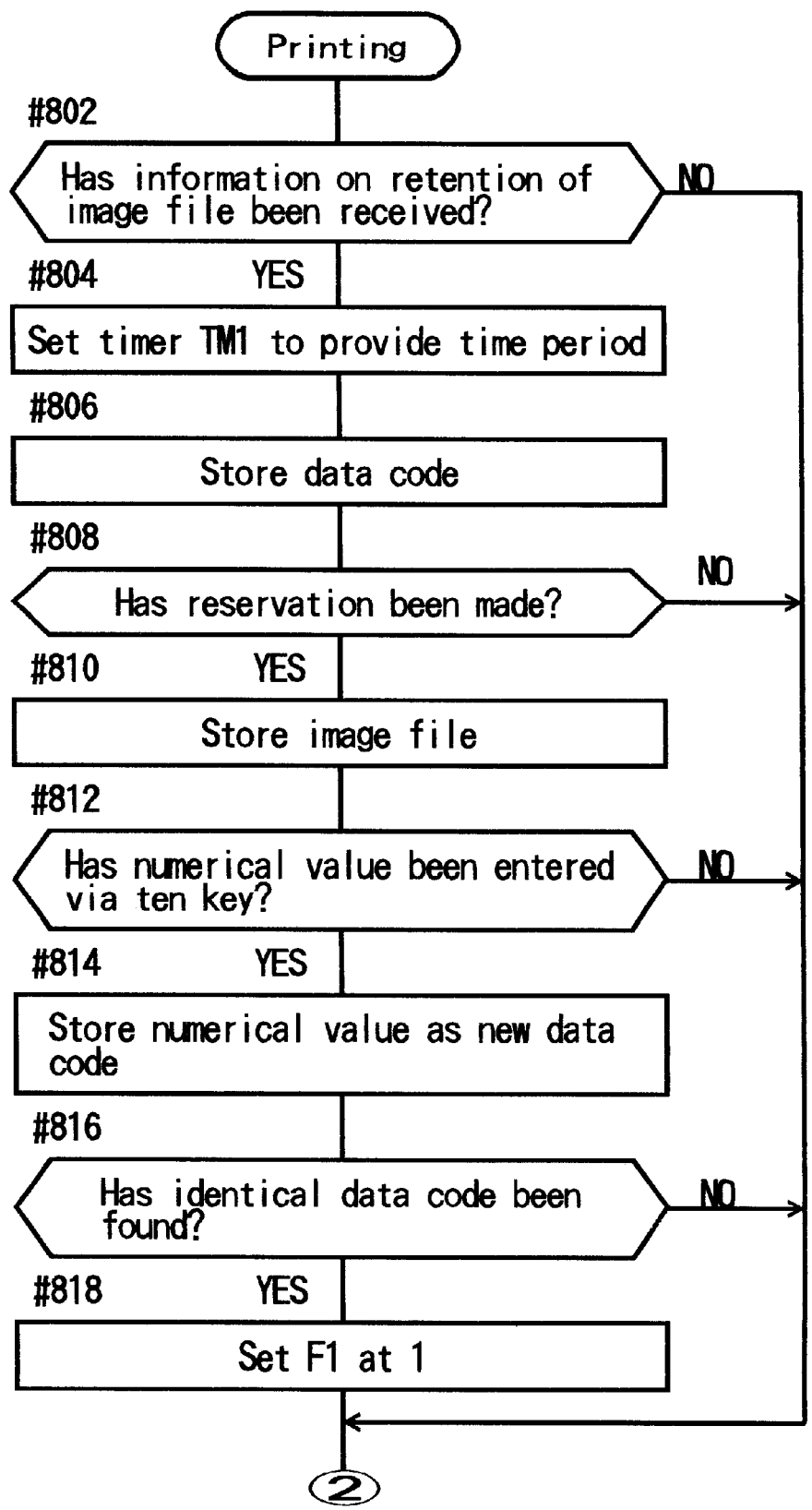
FIG. 18(A) and FIG. 18(B) are details showing a portion of FIG. 15 in connection with the command to print an image.
Figure 18:
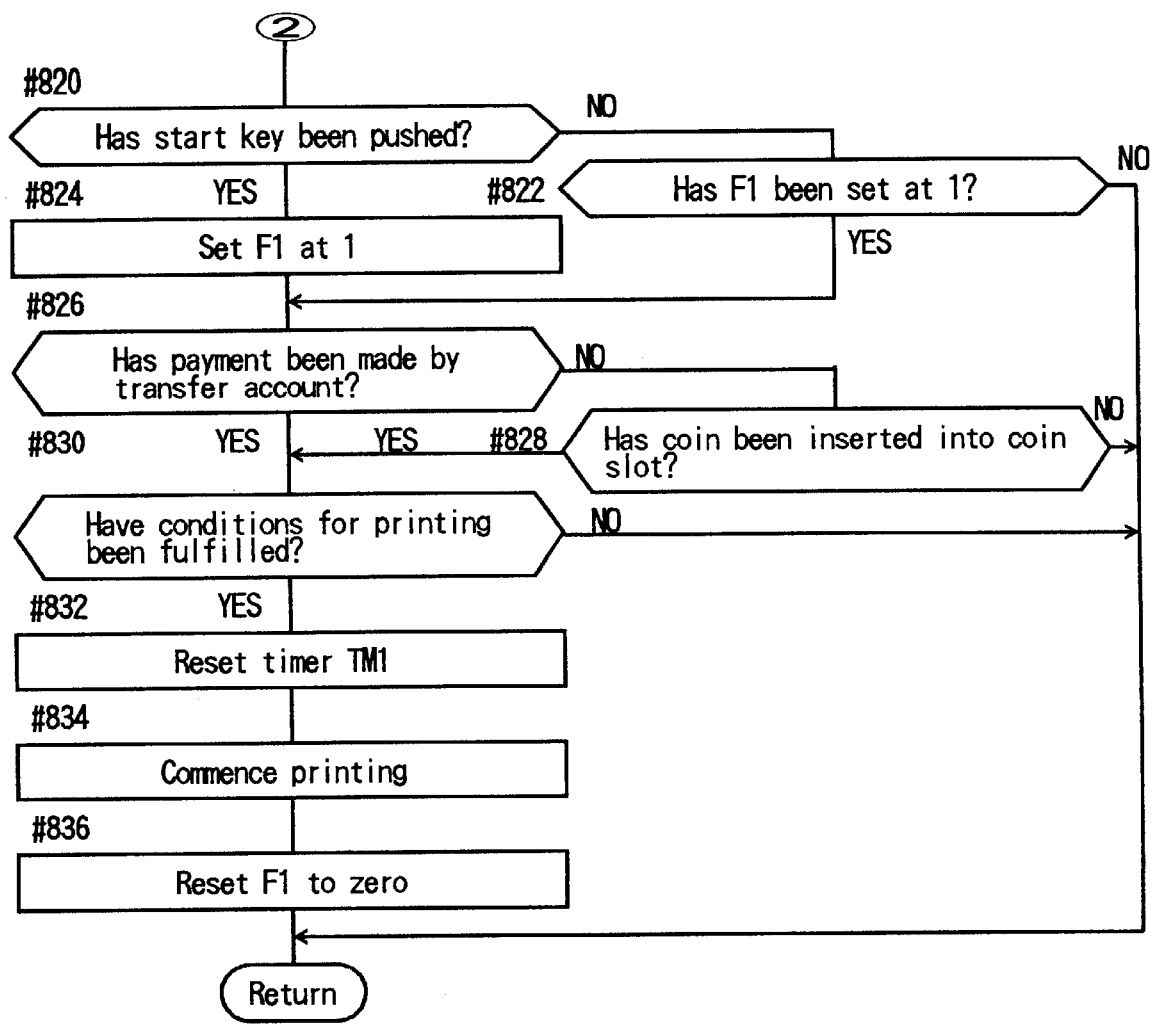

FIG. 17 is a detail showing a portion of FIG. 15 in connection with the erasure of data. The copying machine 3 passes a judgment on whether or not a request for the erasure of data has been received from the second data processor 4 (step 702). If an affirmative answer is given in step 702, it means that a user, who first wished to obtain a printout, has failed to allow the copying machine 3 to execute a printing process within a time period preset in the timer TM(N). Therefore, he or she is regarded as having no mind to obtain a printout any longer, and the data code DC stored in the memory 131 is deleted (step 710). An image file DF, to which the data code DC has been given, is also erased if it is retained in the memory 131 (step 714).

If a negative answer is given in step 702, the copying machine 3 passes a judgment on whether or not all the printing processes have been executed (step 704). The processing proceeds to step 710 when an affirmative answer is given in step 704. When a negative answer is given therein, the copying machine 3 passes a judgment on whether or not all the coins that remained in the vending station 200 have been returned to the user (step 706). When an affirmative answer is given in step 706, the printing process or processes are regarded as having been interrupted. Therefore, a command to retain the information PD is given to the second data processor 4 (step 712).

A time period preset in a timer TM1 begins to elapse at the moment when the data code DC is received from the second data processor 4. If a negative answer is given in step 706, the copying machine 3 passes a judgment on whether or not the time period preset in the timer TM1 is up (step 708). If the time period is found to be up, the copying machine 3 is regarded as having been allowed to stand since the printing process or processes were interrupted. The processing proceeds to step 712.

FIG. 18(A) and FIG. 18(B) are details showing a portion of FIG. 15 in connection with the execution of a printing process. The copying machine 3 passes a judgment on whether or not the information that the second data processor 4 retains the image file DF has been transmitted therefrom to the copying machine 3 together with the data code DC (step 802). If an affirmative answer is given in step 802, the timer TM1 is set to provide a certain time period, at the end of which the image data are to be erased. This time period begins to elapse (step 804). The data code DC is stored in the memory 131 (step 806) so as to be compared later on with a data code DC to be entered by the user via the ten-button key set 181.

When the information received from the second data processor 4 together with the data code DC contains the date and hour RD reserved for printing (i.e., when an affirmative answer is given in step 808), the image file DF received together therewith is also stored in the memory 131 (step 810).

Then the copying machine 3 passes a judgment on whether or not the user has come to operate the ten-button key set 181 (step 812). A numerical value entered, if any, via the ten-button key set 181 is regarded as a new data code DC (step 814). If an old data code identical with this new data code DC is found to be present in the memory 131 (i.e., when an affirmative answer is given in step 816), a printout enabling flag F1 is set at "1" (step 818).

The copying machine 3 passes a judgment on whether or not the start key 186 (FIG. 5) provided on the control panel 18 has been pushed (step 820). The printout enabling flag F1 is set when the start key 186 is found to have been pushed (step 824). The processing proceeds to step 826. When the printout enabling flag F1 has already been set although the start key 186 is not found to have been pushed (i.e., when an affirmative answer is given in step 822), the processing likewise proceeds to step 826.

If payment for printing is made either beforehand by the utilization of a transfer account (step 826) or in the site of the copying machine 3 by inserting a coin or coins into the coin slot 222 (step 828), and if all other conditions necessary for printing are also fulfilled (step 830), the timer TM1 resets itself (step 832) and a printing process begins to be executed (step 834). The printout enabling flag F1 is also reset to zero (step 836).

Figure 19:
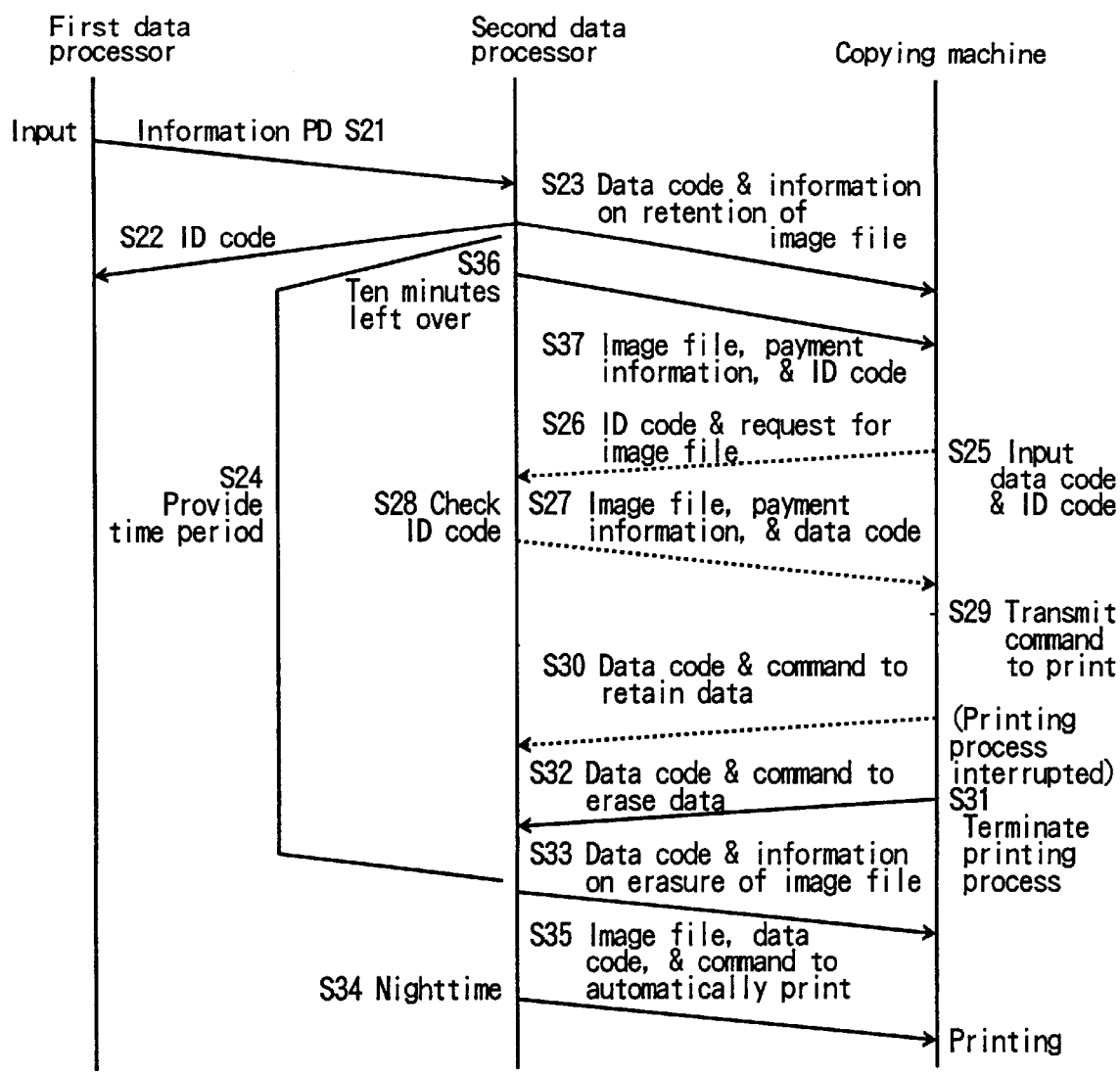
FIG. 19 is a modified form of a sequence diagram of the printing system.
Figure 20:
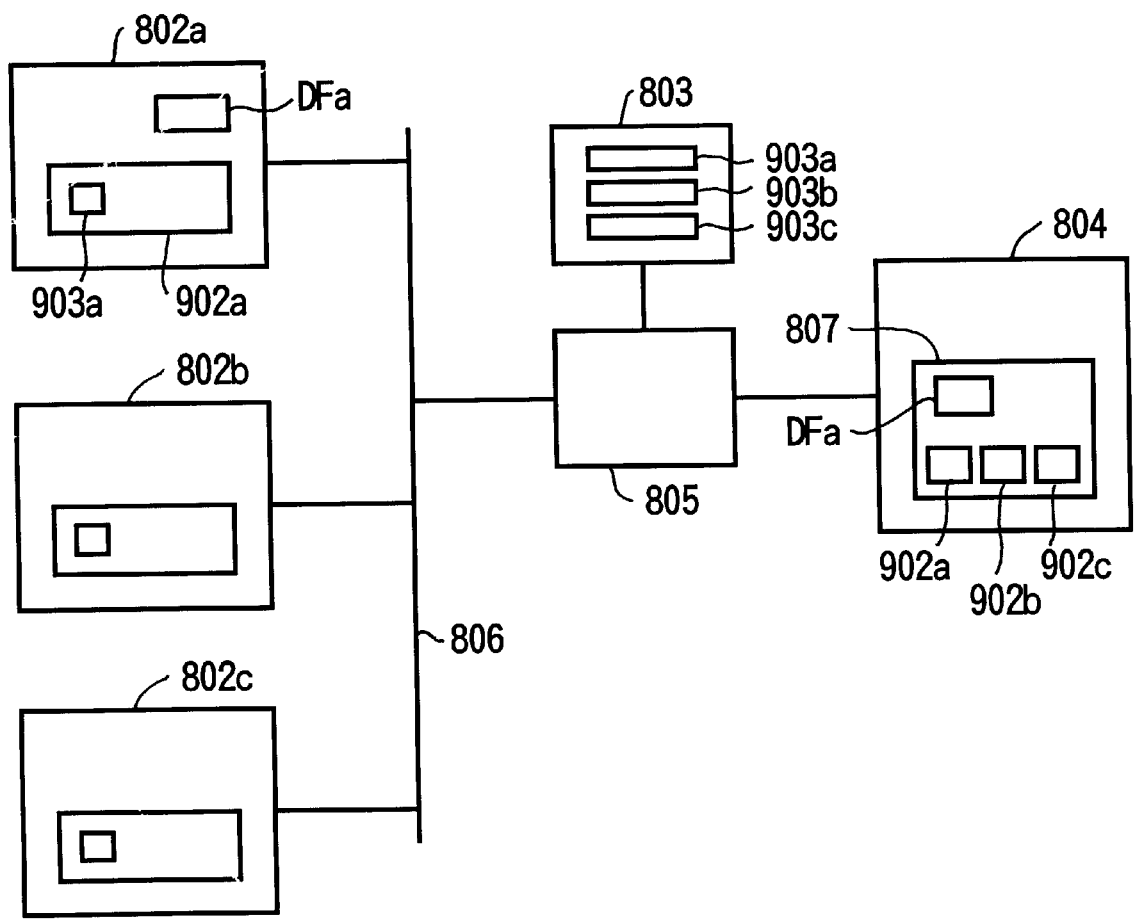
FIG. 20 is a block diagrammatic representation of a conventional printing system.

FIG. 19 is a modified form of a sequence diagram of the printing system 1.

In order to make a request for printing, information PD containing an image file DF on the basis of which a user wishes to print out an image in hard copy is transmitted from a first data processor 5 to the second data processor 4 (S21). Simultaneously with this transmission, payment for printing may be made to the second data processor 4 by the utilization of electronic data communication.

On receipt of the information PD, the second data processor 4 produces an ID code UC to be allotted thereto and transmits the same to the first data processor 5 from which the information PD has been received (S22). Then the ID code UC is displayed on the screen of the display 51 of the first data processor 5 and stored by the user in his or her storage medium MM1 or MM2, in the contingent absence of which he or she memorizes the ID code UC.

Simultaneously with the transmission of the ID code UC from the second data processor 4 to the first data processor 5, information that the second data processor 4 retains the image file DF is transmitted therefrom to the copying machine 3 together with the data code DC, date and hour RD reserved for printing, and payment method FM (S23). These pieces of information are stored in the memory 131. The aforesaid information that the second data processor 4 retains the image file DF does not contain the image file DF per se.

Then a time period begins to elapse, at the end of which the information PD is to be erased (S24). At the end of this time period, the data code DC and the image file DF to which it has been given are erased. Information that they have been erased is transmitted to the copying machine 3 involved (S33).

If the information PD contains the date and hour RD and if a moment has come when ten minutes are left over before the specified hour RD (S36), the image file DF contained in the information PD is transmitted to the copying machine 3, together with the ID code UC and information on whether or not payment for printing has already been made (S37). These pieces of information are stored in the memory 131 incorporated in the copying machine 3. Consequently, the necessity for a user to wait for the image file DF by the side of the copying machine 3 is obviated.

The user takes the aforesaid storage medium MM1 or MM2 in which the ID code UC is stored, and goes to the convenience store or the like in which the copying machine 3 involved is installed. Preferably, he or she should turn up just at the right time in view of the specified time RD.

The storage medium MM1 or MM2 is inserted into the reader 39 so that the data code DC and the ID code UC may be read therefrom (S25). In the contingent absence of the storage medium MM1 or MM2, the user manually inputs the data code DC and the ID code UC to the copying machine 3 through the control panel 18.

On receipt of the data code DC, the copying machine 3 checks whether or not an identical data code is stored in the memory 131. When an identical data code is found to be stored in the memory 131, and when the ID code UC, etc. have already been received from the second data processor 4, the copying machine 3 checks whether or not an identical ID code is stored in the memory 131.

If the user begins to operate the copying machine 3 before the specified time RD, the ID code UC, etc. have not yet been transmitted to the copying machine 3 at that moment. In this case, the copying machine 3 requests the second data processor 4 to transmit the image file DF. This request is accompanied by the ID code UC and is made at the end of the aforesaid checkup on the data code DC (S26).

On receipt of the aforesaid request, the second data processor 4 collates the ID code UC stored in the storage device 41 with the ID code UC received from the copying machine 3 and checks whether or not the former agrees with the latter (S28). In case of agreement, the image file DF to which the ID code UC has been allotted is transmitted to the copying machine 3, together with the data code DC and information on whether or not payment for printing has already been made (S27).

The image file DF is not transmitted to the copying machine 3 when the ID code UC stored in the storage device 41 does not agree with the ID code UC received from the copying machine 3. Such an arrangement is particularly useful for preventing the user from obtaining a printout on the basis of a wrong image file and for preventing an unauthorized person from stealthily obtaining a printout on the basis of the image file DF.

When the start key 186 (FIG. 5) is pushed by the user, the copying machine 3 begins to print out an image on the basis of the specified image file DF (S29), provided that payment for printing is made either beforehand by the utilization of a transfer account or in the site of the copying machine 3 by inserting a coin or coins into the coin slot 222 (FIG. 6).

When the printing process in the copying machine 3 comes to an end (S31), a command to erase data is transmitted from the copying machine 3 to the second data processor 4. This command is accompanied by the data code DC (S32). On receipt of this command, the second data processor 4 erases from the storage device 41 the information PD containing the data code DC. Such erasure makes it possible to effectively utilize memory locations in the storage device 41.

When the printing process is interrupted because, e.g., the copying machine 3 has run out of copy sheets, a command to retain data is transmitted from the copying machine 3 to the second data processor 4 (S30). On receipt of this command, the second data processor 4 brings the timer to a halt or elongates the length of time for which the information PD is retained.

The information PD is forcedly erased from the storage device 41 at the moment when the time which has been set in the timer is up, irrespective as to whether or not the information PD contains an image file or files on the basis of which a printing process has not been executed yet.

Some of the users have an eye on the nighttime because lower rates than the daytime rates are granted for printing and only a small number of persons come to the convenience store for using the copying machine 3. When a user has specified either the nighttime or the time RD in terms of a day alone, a command to automatically execute a printing process is transmitted at night from the first data processor 5 to the second data processor 4 (S34).

The aforesaid command is transferred from the second data processor 4 to the copying machine 3. At the time of transfer, this command is accompanied by the data code DC and the image file DF (S35). On receipt of this command, the copying machine 3 prints out an image on the basis of the specified image file DF. Information such as the data code DC may be automatically added to the printed image. The hard copy is delivered later on to the user in exchange for payment for printing. A user who has already paid for printing can receive the hard copy by presenting the data code DC and the ID code UC.

Thus an important feature of the printing system 1 is that an ID code UC is given to each request for printing and that the user has to input the ID code UC to the copying machine 3 in order to actually allow the copying machine 3 to execute a printing process. Such an arrangement is particularly useful for preventing the user from obtaining a printout on the basis of a wrong image file and for preventing an unauthorized person from stealthily obtaining a printout on the basis of the image file DF.

The provision of means for loading the data code DC and the ID code UC from the storage medium MM1 or MM2 to the copying machine 3 serves to prevent unintentional printout from being caused by a slip of input.

Until a user inputs an ID code UC to a copying machine 3, an image file DF transmitted from a first data processor 5 to the second data processor 4 is not transferred to the copying machine 3 but is held by the second data processor 4. By virtue of such an arrangement, even a rush of requests for printing does not cause a necessity for larger storage capacity to come upon the memory 131 incorporated in the copying machine 3.

Depending on the date and hour RD reserved for printing, it is possible to adjust the moment when the image file DF is transferred from the second data processor 4 to the copying machine 3. By virtue of this arrangement, the number of image files DF to be stored in the memory 131 can be held down to the minimum.

In the embodiment described, the information PD containing an image file or files DF is transmitted from a first data processor 5 to the second data processor 4. However, it is also possible to defer the transmission of the image file DF per se until the copying machine 3 requests the second data processor 4 to transmit the image file DF, which is then transmitted from the first data processor 5 to the copying machine 3 either directly or through the second data processor 4. Such an arrangement serves to reduce the storage capacity of the storage device 41 incorporated in the second data processor 4.

It is possible to connect the second data processor 4 to a copying machine 3 either through a network including a first data processor 5 or through a leased line separated from the aforesaid network. A copying machine 3 and a second data processor 4 may be biunivoquely connected to each other so that, when a request for printing is to be transmitted by a user from a first data processor 5, the information PD may be transmitted to a second data processor 4 connected to a copying machine 3 from which the user wishes to obtain a printout. In this case, the copying machine 3 and the second data processor 4 may be located at the same location, and either of them may be provided with a display similar to the display 51 provided on the first data processor 5 so that a data item or items needed for allowing the copying machine 3 to execute a printing process can be selected by the user from among those displayed on the screen of the display. The printing system 1 may be a client-server system, in which case the server in the form of the second data processor 4 is designed to provide a service to a client in the form of a first data processor 5.

In the embodiment described, the second data processor 4 collates the ID code UC stored in the storage device 41 with the ID code UC received from the copying machine 3 and checks whether or not the former agrees with the latter. However, it is also possible to have the second data processor 4 transmit the ID code UC to the copying machine 3 so that the aforesaid collation may be carried out in the latter.

Instead of the digital copying machine 3 used in the embodiment described, it is also possible to use a printer in the form of single equipment either adapted to be connected to the second data processor 4 or adapted to act also as a facsimile.

What has been mentioned in the paragraph before last applies mutatis mutandis to the printer mentioned in the preceding paragraph.

By the expression "data file" as used herein are meant various types of files including an image file DF listing image data and a text file listing text data as well as data sets and tables.

Examples of the storage medium MM1 or MM2 are a floppy disk, magneto-optic disk and IC card.

The name of a data file may be used as a data code DC. The data codes commonly in use consist of Arabic numerals and/or the letters of the alphabet.

It is also contemplated that, every time the second data processor 4 receives the transmission of a request for printing, the second data processor 4 regards it as having originated from a user and allots an ID code UC thereto. A plurality of data files may be contained in a single dispatch of such transmission.

As has been above explained, the ID code UC is a very effective protection against unauthorized printing.

The user can input the ID code UC to the copying machine 3 in two modes, namely a manual input mode wherein the ID code UC is entered via the control panel 18 and an automatic readout mode wherein the ID code UC is read by the reader 39 out of the storage medium MM1 or MM2.

In the embodiment described, the information PD together with a command to automatically execute a printing process is transmitted from the second data processor 4 to the copying machine 3 at the moment when ten minutes are left over before the specified hour RD. However, it is also possible to transmit the information PD and the aforesaid command at the moment when e.g. 5, 20 or 30 minutes are left over before the specified hour RD.

By way of a countermeasure to be taken in advance against the case where a negative answer is given in step 408 of FIG. 14, the moment when the information PD together with a command to automatically execute a printing process is transmitted from the second data processor 4 to the copying machine 3 should be determined in due consideration of the distance between the copying machine 3 and the first data processor 5 and a traffic jam which may be encountered therebetween. A spontaneous transfer unit may be provided for determining such a moment for each of the first data processors 5 and for transferring the information PD and the aforesaid command at that moment.

A personal computer or a workstation, in which an appropriate program is installed, may be suitable for use as the first data processor 5 and the second data processor 4. The program is stored in a RAM, ROM or hard disk, or read out of a CD-ROM, magneto-optic disk or floppy disk, or downloaded from a host computer or other information source through a telecommunication line, and affords necessary capabilities to various operating systems in various system environments and platforms.

Changes in the construction of the first data processor 5, second data processor 4 and copying machine 3, as well as electrical circuits and data processing system designs therefor may be made without departing from the nature and principle of the invention.

What is claimed is:

1. A printing system having a printer for printing an image on the basis of a data file transmitted from a data processor, comprising:

an ID code transmitter for allotting an ID code to said data file for distinguishing said data file from others, said ID code being transmitted to said data processor;

an input device mounted on said printer for providing said ID code to said printer before a printing process is executed; and a printer control enabling said printer to execute said printing process in response to said ID code entered via said input device, said printing process being to be executed on the basis of said data file to which said entered ID code has been allotted.

2. A printing system as defined in claim 1, further comprising:

an additional data processor connected to the first mentioned data processor through a telecommunication line; and a storage device mounted in said additional data processor for storing said data file and said ID code allotted thereto;

wherein, said data file to which said printing process being to be enabled to execute by said printer control is transferred from said storage device to said printer.

3. A printing system as defined in claim 2, wherein:

said ID code entered via said input device is transferred to said additional data processor; and said printer control collates said ID code entered via said input device with said ID code allotted by said ID code transmitter and, in case of the former agreeing with the latter, enables said printer to execute said printing process on the basis of said data file to which said ID code has been allotted and transfers said data file to said printer.

4. A printing system as defined in claim 1, wherein said printer receives said ID code allotted to said data file from said ID code transmitter, collates said ID code entered via said input device with said ID code allotted by said ID code transmitter and, in case of the former agreeing with the latter, enables said printer to execute said printing process on the basis of said data file to which said entered ID code has been allotted.

5. A printing system as defined in claim 1, wherein:

said first mentioned data processor has a writing device for writing said ID code onto a demountable storage medium when said ID code has been received from said ID code transmitter; and said input device provides said ID code to said printer by accepting said storage medium and reading said ID code therefrom.

6. A printing system comprising:

a plurality of first data processors, each of said first data processors having a transmit control;

a second data processor connected to said first data processors and adapted to receive a data file and a data code for distinguishing said data file from others from said transmit control, said second data processor having an ID code transmitter for allotting an ID code to said received data code and transmitting said ID code to any one of said first data processors from which said data file and said data code have been received, said second data processor further having a storage device for storing said data file, said data code given thereto, and said ID code allotted thereto; and a printer connected to said second data processor and having an input device to be used to input said data code and said ID code for specifying said data file before a printing process is executed on the basis thereof;

wherein, a judgment is formed, on the basis of the contents of said storage device, on whether or not said ID code entered via said input device agrees with said ID code allotted by said ID code transmitter to said data code entered via said input device and, in case of the former agreeing with the latter, enabling said printer to execute said printing process on the basis of said data file to which said data code has been given.

7. A printing system as defined in claim 6, wherein said ID code entered via said input device is transmitted to said second data processor so that said judgment may be formed therein.

8. A printing system as defined in claim 6, wherein said printer receives said ID code allotted to said data file from said ID code transmitter and forms a judgment on whether or not said ID code entered via said input device agrees with said ID code allotted by said ID code transmitter to said data code.

9. A printing system as defined in claim 6, wherein:

said first mentioned data processor has a writing device for writing said ID code onto a demountable storage medium when said ID code has been received from said ID code transmitter; and said input device provides said ID code to said printer by accepting said storage medium and reading said ID code therefrom.

10. A printing system having a storage device for storing a data file transmitted from a data processor, a printer for printing an image on the basis of said data file read out of said storage device, and wherein fixing the amount of the charge for printout, comprising:

a process judgment device for forming a judgment on whether or not a printing process for said data file has been executed in said printer by the end of a preset time period;

a payment judgment device for forming a judgment on whether or not payment for printing for said data file has already been made; and a deleting device for deleting said data file when the judgment formed by said process judgment device is that a printing process for said data file has not been executed in said printer by the end of a preset time period and when the judgment formed by said payment judgment device is that payment for printing for said data file has not been made yet.

11. A printing system as defined in claim 10, wherein said data file is transmitted from said data processor together with information on payment information.

12. A printing system as defined in claim 11, wherein said payment judgment device forms a judgment on the basis of said payment information.

13. A printing system as defined in claim 10, wherein said deleting device is adapted to retain said data file in said storage device when the judgment formed by said process judgment device is that a printing process for said data file has not been executed in said printer by the end of a preset time period and when the judgment formed by said payment judgment device is that payment for printing for said data file has already been made.

14. A printing system as defined in claim 10, wherein said deleting device is adapted to erase said data file at the end of an elongated time period when the judgment formed by said process judgment device is that a printing process for said data file has not been executed in said printer by the end of a preset time period and when the judgment formed by said payment judgment device is that payment for printing for said data file has already been made.

15. A printing system as defined in claim 10, wherein said deleting device is adapted to generate an output indicative of an alarm condition when the judgment formed by said process judgment device is that a printing process for said data file has not been executed in said printer by the end of a preset time period and when the judgment formed by said payment judgment device is that payment for printing for said data file has already been made.

16. A printing system as defined in claim 10, wherein said payment judgment device forms a judgment on whether or not payment for printing for said data file has already been made by a method utilizing a digital cash.

17. A printing system as defined in claim 10, wherein said payment judgment device forms a judgment on whether or not payment for printing for said data file has already been made by a method utilizing a transfer account.

18. A printing system as defined in claim 10, further comprising an additional data processor connected to the first mentioned data processor and to at least one data processor having an identical construction with said first mentioned data processor through telecommunication lines, said additional data processor having a storage device and three judgment device similar to said storage device and mentioned three judgment device respectively.

19. A printing system as defined in claim 18, wherein said data file is transmitted from said first mentioned data processor to said additional data processor together with information on payment information.

20. A printing system as defined in claim 19, wherein said payment judgment device forms a judgment on the basis of said payment information.

21. A printing system having a data processor, a first storage device for storing a data file transmitted from said data processor, and a printer for printing an image on the basis of said data file transmitted from said first storage device, comprising:

an input device mounted on said printer for giving a command to start printing;

a second storage device mounted in said printer for storing said data file;

transfer device for transferring said data file from said first storage device to said second storage device before a printing process is started by a command entered via said input device; and a printer control enabling said printer to execute said printing process in response to said command entered via said input device, said printing process being to be executed on the basis of said data file read out of said second storage device.

22. A printing system as defined in claim 21, further comprising an additional data processor connected to the first mentioned data processor and to at least one data processor having an identical construction with said first mentioned data processor through telecommunication lines, said additional data processor having said first storage device.

23. A printing system as defined in claim 21, wherein said transfer device transfers said data file from said first storage device to said second storage device before said command is given to said printer.

24. A printing system having a data processor, a first storage device for storing a data file transmitted from said data processor, and a printer for printing an image on the basis of said data file transmitted from said first storage device, comprising:

a second storage device mounted in said printer for storing said data file;

a first transmitter for transferring said data file from said first storage device to said second storage device in response to a request for data made from said printer;

a second transmitter for transferring said data file from said first storage device to said second storage device independently of a request for data made from said printer; and said printer executing a printing process on the basis of said data file read out of said second storage device.

25. A printing system as defined in claim 24, wherein said second transmitter transfers said data file from said first storage device to said second storage device at a moment when a predetermined time period is left over before the time reserved for printing.

26. A printing system as defined in claim 24, further comprising a control panel mounted on said printer so as to be under the control of an operator whereby a request for data may be made from said printer.

27. A printing system as defined in claim 26, wherein said control panel has an input keyboard used to input a code for distinguishing said data file from others.

* * * * *